(12) United States Patent
Cooperstock et al.

(10) Patent No.: US 9,041,521 B2
(45) Date of Patent: May 26, 2015

(54) FLOOR-BASED HAPTIC COMMUNICATION SYSTEM

(75) Inventors: Jeremy Cooperstock, Westmount (CA); Yon Visell, Zurich (CH); Alvin Law, Vancouver (CA); Karmen Franinovic, Zurich (CH)

(73) Assignee: The Royal Institution for the Advancement of Learning/McGill University, Montreal, Quebec (CA)

( * ) Notice: Subject to any disclaimer, the term of this patent is extended or adjusted under 35 U.S.C. 154(b) by 456 days.

(21) Appl. No.: 12/794,045

(22) Filed: Jun. 4, 2010

(65) Prior Publication Data

US 2010/0308982 A1 Dec. 9, 2010

Related U.S. Application Data

(60) Provisional application No. 61/184,015, filed on Jun. 4, 2009.

(51) Int. Cl.
| | | |
|---|---|---|
| *H04B 3/36* | (2006.01) | |
| *G08B 21/00* | (2006.01) | |
| *G06F 3/041* | (2006.01) | |
| *B25J 19/02* | (2006.01) | |
| *B25J 9/10* | (2006.01) | |
| *G08B 6/00* | (2006.01) | |
| *G06F 3/01* | (2006.01) | |

(52) U.S. Cl.
CPC *G08B 6/00* (2013.01); *G06F 3/011* (2013.01); *G06F 3/016* (2013.01)

(58) Field of Classification Search
CPC . G06F 3/016; G06F 17/60; A63B 2071/0027; A63B 21/1473; A63B 26/00; B32B 3/20

USPC ............... 340/4.1, 4.11, 4.12, 407.1, 407.2
See application file for complete search history.

(56) References Cited

U.S. PATENT DOCUMENTS

| | | | | |
|---|---|---|---|---|
| 4,658,696 | A | * | 4/1987 | Clancy ........................ 84/444 |
| 5,889,510 | A | * | 3/1999 | Klarlund .................... 345/168 |
| 6,122,846 | A | | 9/2000 | Gray et al. |
| 6,642,685 | B2 | * | 11/2003 | Onodera ................. 318/568.16 |
| 6,923,773 | B2 | | 8/2005 | Leivseth et al. |
| 6,940,139 | B2 | * | 9/2005 | Funaki ........................ 257/415 |
| 7,594,878 | B1 | | 9/2009 | Joannou |
| 7,883,425 | B2 | * | 2/2011 | Joseph ......................... 472/88 |
| 7,955,224 | B2 | * | 6/2011 | Curley ........................ 482/23 |
| 2004/0183783 | A1 | * | 9/2004 | Rojas et al. .................. 345/168 |
| 2004/0260470 | A1 | * | 12/2004 | Rast ............................ 701/300 |

(Continued)

OTHER PUBLICATIONS

J. Hijmans, J. Geertzen, B. Schokker, and K. Postema, Development of vibrating insoles, Int. J Rehabil Res, 30(4), 2007.

(Continued)

*Primary Examiner* — Jennifer Mehmood
*Assistant Examiner* — Pameshanand Mahase
(74) *Attorney, Agent, or Firm* — Rosenberg, Klein & Lee

(57) ABSTRACT

The present relates to a system for providing vibration feedback to at least one foot. The system comprises at least one rigid surface for receiving the at least one foot, one vibrotactile actuator for each of the at least one rigid surface, and a suspension mechanism. The vibrotactile actuator is installed underneath the corresponding rigid surface and provides vibration feedback there through. The suspension mechanism supports the at least one rigid surface.

20 Claims, 21 Drawing Sheets

(56) References Cited

U.S. PATENT DOCUMENTS

| | | | | |
|---|---|---|---|---|
| 2009/0167694 | A1* | 7/2009 | Tan et al. | 345/168 |
| 2009/0240170 | A1* | 9/2009 | Rowley et al. | 600/595 |
| 2010/0013613 | A1* | 1/2010 | Weston | 340/407.2 |
| 2010/0052880 | A1* | 3/2010 | Laitinen et al. | 340/407.2 |
| 2010/0053087 | A1* | 3/2010 | Dai et al. | 345/168 |

OTHER PUBLICATIONS

E. Hoggan and S. Brewster, Designing audio and tactile crossmodal icons for mobile devices, In Proc. of ACM ICMI, 2007.
J. Hollerbach, Locomotion interfaces and rendering, In M. Lin and M. Otaduy, editors, Haptic Rendering: Foundations, Algorithms and Applications, A K Peters, Ltd., 2008.
K. H. Hunt and F. R. E. Crossley, Coefficient of restitution interpreted as damping in vibroimpact ASME Journal of Applied Mechanics, 42(2):440-445, 1975.
J. Inglis, P. Kennedy, C. Wells, and R. Chua, The Role of cutaneous receptors in the foot, Adv Exp Med Biol., 508:111-117, 2002.
H. Iwata, Haptic interface, In A. Sears and J. A. Jacko, editors, The Human-Computer Interaction Handbook, Lawrence Erlbaum Assoc., New York, 2nd edition, 2008.
L. A. Jones and N. B. Sarter, Tactile displays: Guidance for their design and application, Human Factors, 50(1):90-111, 2008.
P. M. Kennedy and J. T. Inglis, Distribution and behaviour of glabrous cutaneous receptors in the human foot sole, J. Physiol., 583(3), 2002.
Y. Kabayashi, R. Osaka, T. Hara, and H. Fujimoto, How accurately people can discriminate the differences of floor materials with various elasticides, IEEE Transactions on Neural Systems and Rehabilitation Engineering, 16(1), 2008.
Y. Kobayashi, T. Takashima, M. Hayashi, and H. Fujimoto, Gait analysis of people walking on tactile ground surface indicators, IEEE Transactions of Neural Systems and Rehabilitation Engineering, 13(1):53-59, Mar. 2005.
K. E. MacLean, Foundations of transparency in tactile information design, IEEE Transactions on Haptics, 1(2):84-95, 2008.
J. A. Michon, editor, Generic Intelligent Driver Support, CRC Press, 1993.
A. Priplata, J. Niemi, M. Salen, J. Harry, L. A. Lipsitz, and J. J. Collins, Noise-enhanced human balance control, Phys. Rev. Lett., 89(23):238101, 2002.
A. A. Priplata, B. L. Patritti, J. B. Niemi, R. Hughes, D. C. Gravelle, L. A. Lipsitz, A. Veves, J. Stein, P. Bonato,a nd J. J. Collins, Noiseenhanced balance control in patients with diabetes and patients with stroke, Annals of Neurology, 59 (1):4-12, 2006.
E. Ribot-Ciscar, J. P. Roll, and G. M. Gauthier, Comparative effects of whole body vibration on sensorimotor performance achieved with mini-stick and a macro-stick in force and position control modes, Aviat. Space Environ. Med., 57:792-799, 1986.
E. Ribot-Ciscar, J. P. Vedel, and J. P. Roll, Vibration sensitivity and slowly and rapidly adapting cutaneous mechanoreceptors in the human foot and leg, Neuroscience Letters, 104(130-135), 1989.
D. Rocchesso and F. Fontana, editors, The Sounding Object, Edizioni di Mondo Estremo, Florence, Italy, 2003.
J. P. Roll and J. C. Gilhodes, Proprioceptive sensory codes mediating movement trajectory perception: human and vibration-induced drawing illusions, Canadian J. of Physiology and Pharmacology, 73(2):295-304, 1995.
T. Rosburg, Tactile ground surface indicators in public places, in M. Grunwald, editor, Human Haptic Perception Birkhauser, 2008.
J. Rovan and V. Hayward, Typology of tactile sounds and their synthesis in gesture-driven computer music performance, In M. Wanderley and M. Battier, editors, Trends in Gestural Control of Music, Editors IRCAM, 2000.
A. F. Rovers and H. van Essen, Guidelines for haptic interpersonal communication applications, Virtual Reality,-:177-191, 2006.
A. Tax, B. van Wezel, and V. Dietz, Bipedal reflex coordination to tactile stimulation of the sural nerve during human running, J. Neurophysiology, 73(5), 1995.
D. Temes and K. E. MacLean, Designing large sets of haptic icons with rhythm, In Proc. of Eurohaptics, 2008.
M. Trulsson, Microreceptive afferents in the human sural nerve, Exp Brain Res, 137:111-116, 2001.
J. B. F. van Erp and M. M. A. Spape, Distilling the underlying dimensions of tactile melodies, In Proc. of Eurohaptics, 2003.
R. Velazquez, On-shoe tactile display, In Proc. of the IEEE Intl. Workshop on Haptic Audio Visual Environments and Their Applications, 2008.
W. H. Warren and R. R. Verbrugge, Auditory perception of breaking and bouncing events: a case study in ecological acoustics, Journal of Experimental Psychology: Human Perception and Performance, 10(5), 1984.
S. Weinstein, Intensive and extensive aspects of tactile sensitivity as a function of body part, sex, and laterality, In D. R. Kenshalo, editor, The skin senses, Thomas, 1968.
C. Wells, L. M. Ward, R. Chua, and J. T. Inglis, Regional Variation and Changes With Ageing in Vibrotactile Sensitivity in the Human Footsole, J. Gerontol A Biol Sci Med Sci, 58(8):B680-686, 2003.
A. Wilska, On the vibrational sensitivity in different regions of the body surface, Acta Physiologica Scandinavica, 31:285-289, 1954.
E. P. Zehr, R. B. Stein, and T. Komiyama, Function of sural nerve reflexes during human walking, J Physiol, 507:305-314, 1998.
Visell, Y et al., Touch is Everywhere: Floor Surfaces as Ambient Haptic Interfaces, IEEE Transactions of Haptics, 2 (3), Jul.-Sep. 2009.
Visell, Y et al., Desigh of a Vibrotactile Device via a Rigid Surface, Proceedings of the IEEE Haptics Symposium, 2010 (Awarded best paper).
Visell, Y et al., Contact Sensing and Interaction Techniques for a Distributed, Multimodal Floor Display, Proceedings of the IEEE Symposium on 3D User Interfaces, 2010.
Visell, Y et al., Interaction Capture in Immersive Environments via an Intelligent Floor Surface, Proceedings of IEEE Virtual Reality, 2010.
Rajalingham, R et al., Probabilistic Tracking of Pedestrian Movements from In-floor Force Measurements, Proceedings of the 7th Canadian Conference on Computer and Robot Vision (CRV'10), 2010.
Visell, Y et al., A Vibrotactile Device for Display of Virtual Ground Materials in Walking, Proceedings of Eurohaptics, Jun. 2008.
Visell, Y et al., Sound Design and Perception in Walking Interactions, Int J Human Computer Interaction Studies, 67 (11), Elsevier, 2009.
Visell, Y, Tactile Sensory Substitutions: Models for Enaction in HCI, Interacting with Computers, 21 (1-2), Elsevier, 2009.
Visell, Y et al., Toward Iconic Vibrotactile Information Display via Floor Surfaces, Proceedings of World Haptics, 2009.
Law, A et al., A Multi-modal Floor-space for Experiencing Material Deformation Underfoot in Virtual Reality, Proc. IEEE Intl. Workshop on Haptic Audio Visual Environments and Games (HAVE'08).
Giordano, B. L. et al., Non-Visual Identification of Walking Grounds, Proceedings of Acoustics'08, J. Acoust. Soc. Am. 123 (5):3412, 2008.
D. Arfib. Digital synthesis of complex spectra by means of multiplication of non-linear distorted sine waves, J. of the Audio Engineering Society, 27(10):757-779, 1979.
S. A. Brewster, Non-speech auditory output. In A. Sears and J. A. Jacko, editors, The Human-Computer Interaction Handbook. CRC Press, 2008.
L. M. Brown, S. A. Brewster, and H. C. Purchase, Tactile crescendos and sforzandos: Applying musical techniques to tactile icon design. In Proc. of the ACM 2006 Conference on Human Factors in Computing Systems, 2006.
C. Cadoz, Instrumental gesture and musical composition, In Proc. Of the Intl. Computer Music Conf. (ICMC), International Computer Music Association, 1988.
M. Enriquez, K. E. MacLean, and C. Chita, Haptic phonemes: Basic building blocks of haptic communication, In Proceedings of the 8th International Conference on Multimodal Interfaces, 2006.
A. R. Ferber, M. Peshkin, and J. E. Colgate, Using haptic communications with the leg to maintain exercise intensity, In Proc. Of 16th IEEE International Conference on Robot and Human Interactive Communication (RO-MAN), 2007.

(56) References Cited

OTHER PUBLICATIONS

A. Gallace, H. Z. Tan and C. Spence, The body surface as a communication system: The state of the art after 50 years, Presence: Teleoper. Virtual Environ., 16(6):655-676, 2007.
G. A. Gescheider and R. T. Verrillo, Vibrotactile frequency characteristics as determined by adaptation and masking procedures, In D. R. Kenshalo, editor, Sensory Functions of the Skin of Humans, Plenum, 1978.
V. Hayward and K. Maclean, Do it yourself haptics, Part I, IEEE Robotics and Automation Magazine, 14(4), Dec. 2007.
D. Arfib. "Digital synthesis of complex spectra by means of multiplication of non-linear distorted sine waves", J. of the Audio Engineering society, 27(10): pp. 757-779, 1979.
S.A. Brewster, "Non-speech auditory output", In Jacko, J.A. and Sears, A., The Human-Computer Interaction Handbook, 1, pp. 220-239 2002.
L.M. Brown, S.A. Brewster, and H.C. Purchase, "Tactile crescendos and sforzandos: applying musical techniques to tactile icon design", In Conference on Human Factors in Computing Systems, 22-17, pp. 610-615, 2006.
C. Cadoz, "Instrumental gesture and musical composition", In Proc. of the Intl. Computer Music Conf. (ICMC), International Computer Music Association, pp. 1-13, 1988.
M. Enriquez, K. MacLean, and C. Chita, "Haptic phonemes: Basic building blocks of haptic communication", In Proceedings of the 8th International Conference of Multimodal Interfaces, 2006.
A.R. Ferber, M. Peshkin, and J.E. Colgate, "Using haptic communications with the leg to maintain exercise intensity", In Proc. Of 16th IEEE International Conference on Robot and Human Interactive Communication (RO-MAN), 2007.
A. Gallace, H.Z. Tan and C. Spence, "The body surface as a communication system: The state of the art after 50 years", Presence: Teleoper. Virtual Environ., 16(6), pp. 655-676, 2007.
G.A. Gescheider and R.T. Verrillo, "Vibrotactile frequency characteristics as determined by adaptation and masking procedures", In D.R. Kenshalo, editor, Sensory Functions of the Skin of Humans, Plenum, pp. 183-205, 1978.
E. Hoggan and S. Brewster, "Designing audio and tactile crossmodal icons for mobile device", In Proc. of CM ICMI, pp. 162-169, 2007.
J. Hollerbach, "Locomotion interfaces and rendering", In M. Lin and M. Otaduy, editors, Haptic Rendering: Foundations Algorithms and Applications, A K Peters, Ltd., 2008.
K.H. Hunt and F.R.E. Crossley, "Coefficient of restitution interpreted as damping in vibroimpact", ASME Journal of Applied Mechanics, 42(2), pp. 440-445, 1975.
J. Inglis, P. Kennedy, C. Wells, and R. Chua, "The Role of cutaneous receptors in the food", Adv Exp Med Biol., 508, pp. 111-117, 2002.
H. Iwata, "Haptic interface", In A. Sears and J.A. Jacko, editors, The Human-Computer Interaction Handbook, Lawrence Erlbaum Assoc., New York, 2nd edition, pp. 229-245, 2008.
L.A. Jones and N.B. Sarter, "Tactile displays: Guidance for their design and application" Human Factors, 50(1), pp. 90-111, 2008.
Y. Kobayashi, R. Osaka, T. Nara, and H. Fujimoto, "How accurately people can discriminate the differences of floor materials with various elasticities", IEEE Transactions on Neural Systems and Rehabilitation Engineering, 16(1), pp. 99-105, 2008.

Y. Kobayashi, T. Takashima, M. Hayashi, and H. Fujimoto, "Gait analysis of people walking on tactile ground surface indicators", IEEE Transactions of Neural Systems and Rehabilitation Engineering, 13(1), pp. 53-59, 2005.
K.E. MacLean, "Foundations of transparency in tactile information design", IEEE Transactions on Haptics, 1(2), pp. 84-95, 2008.
J.A. Michone, editor, "Generic Intelligent Driver Support", CRC Press, 1993.
A. Priplata, J. Niemi, M. Salen, J. Harry, L.A. Lipsitz, and J.J. Collins, "Noise-enhanced human balance control", Phys. Rev. Letters, 89(23), pp. 238101-01-23810-04, 2002.
A.A. Priplata, B.L. Patritti, J.B. Niemi, R. Hughes, D.C. Gravelle, L.A. Lipsitz, A. Veves, J. Stein, P. Bonato, and J.J. Collins, "Noise-enhanced balance control in patients with diabetes and patients with stroke", Annals of Neurology, 59 (1), pp. 4-12, 2006.
E. Ribot, J.P. Roll, and G.M. Gauthier, Comparative effects of whole body vibration on sensorimotor performance achieved with mini-stick and macro-stick in force and position control modes, Aviation, Space Environmental Medicine, 57, pp. 792-799, 1986.
E. Ribot-Ciscar, J.P. Vedel, and J.P. Roll, "Vibration sensitivity of slowly and rapidly adapting cutaneous mechanoreceptors in the human foot and leg", Neuroscience Letters, 104, pp. 130-135, 1989.
D. Rocchesso and F. Fontana, editors, "The Sounding Object", Edizioni di Mondo Estremo, Florence, Italy, 2003.
J.P. Roll and J.C. Gillhodes, "Proprioceptive sensory codes mediating movement trajectory perception: human and vibration-induced drawing illusions", Canadian J. of Physiology and Pharmacology, 73(2), pp. 295-304, 1995.
T. Rosburg, "Tactile ground surface indicators in public places", in M. Grunwald, editor, Human Haptic perception Birkhauser, pp. 491-499, 2008.
J. Rovan and V. Hayward, "Typology of tactile sounds and their synthesis in gesture-driven computer music performance", In M. Wanderley and M. Bather, editors, Trends in Gestural Control of Music, Editors IRCAM, 2000.
A.F. Rovers and H. van Essen, "Guidelines for haptic interpersonal communication applications: an exploration of foot interaction styles", Virtual Reality, 9, pp. 177-191, 2006.
M. Truisson, "Mechanoreceptive afferents in the human sural nerve", Exp Brain Res, 173, pp. 111-116, 2001.
M. Magana and R. Velazquez, "On-shoe tactile display", In Proc. of the IEEE Intl. Workshop on Haptic Audio Visual Environments and Their Applications, 2008.
W.H. Warren and R.R. Verbrugge, "Auditory perception of breaking and bouncing events: a case study in ecological acoustics", Journal of Experimental Psychology: Human Perception and Performance, 10(5), pp. 704-712, 1984.
S. Weinstein, "Intensive and extensive aspects of tactile sensitivity as a function of body part, sex and laterality", In D. R. Kenshalo, editor, The Skin Senses, Thomas, pp. 194-222, 1968.
C. Wells, L.M. Ward, R. Chua, and J.T. Inglis, "Regional Variation and Changes With Ageing in Vibrotactile Sensitivity in the Human Footsole", J. Gerontology A Biol Sci Med Sci. 58(8), pp. 680-686, 2003.
A. Wilska, "On the vibrational sensitivity in different regions of the body surface", Acta Physiologica Scandinavica, 31, pp. 285-289, 1954.
E.P. Zehr, R.B. Stein, and T. Komiyama, "Function of sural nerve reflexes during human walking", J Physiology, 507, pp. 305-314, 1998.

* cited by examiner

ON-OFF

A

B

FLOOR-BASED HAPTIC COMMUNICATION SYSTEM

TECHNICAL FIELD

The present relates haptic communications, and more particularly to floor-based haptic communication systems.

BACKGROUND

Tactile feedback has received growing attention as a means of enhancing or enabling information display in diverse computing applications. As human computer interaction has extended beyond the desktop computing paradigm, and into every other domain of human activity, tactile display has grown in importance. This is attributable, in part, to its ability to overcome the sensory overload and attention demands that arise in complex, multitasking environments.

Two new paradigms that have emerged within this context are those of mobile or wearable information appliances, and of ambient computing. While significant attention has been devoted to the opportunities for tactile display to enhance mobile applications, less has been given to haptic interaction with computationally augmented environments. Nonetheless, the fundamental role that floor surfaces play in our haptic negotiation of everyday environments suggests that they hold significant potential for active tactile information display. The design of haptic information for ground surfaces has a long history, as is evidenced in urban environments. Haptic markers are commonly used to indicate locations or paths of interest to visually impaired people. Similarly, they are employed to emphasize low-lying features, such as subway stairs, that need to be highlighted even to sighted individuals.

While the literature on haptic interaction design for the feet is quite limited, much of what is known about haptic communication via other areas of the body may be readily extended thereto. In addition, in large part through research conducted in the last two decades, more is now known about tactile sensation in the feet.

The tactile sensory physiology and psychophysics of the foot have been the subject of considerable research, if to a lesser extent than in the case of the hand. The foot has, since the mid-20th century, been acknowledged as one of the most sensitive parts of the body to vibrotactile stimulation. Its sensory physiology is similar to that of the hand, including the same types of tactile mechanoreceptors as are present in the hand, namely fast-adapting type I and II receptors (FA I, FA II) and slow-adapting type I and II receptors (SA I, SA II). Their nervous responses largely mirror those of receptors in the hand, although some differences in peripheral vibrotactile information coding have been identified.

Receptor spatial distribution in glabrous skin of the foot sole is relatively widely distributed, with (in contrast to the hand) little preferential accumulation in the toe areas. Receptive fields are larger than in the hand by a factor of about three. Physiological activation thresholds are determined to be higher on average—by a factor of approximately eight, in the case of FA II receptors. It has been suggested that this is due, in part, to biomechanical differences between the skin of the hands and of the feet, and possibly to mechanoreceptor properties. The ball and arch of the foot have been found to be the areas most sensitive to vibrotactile stimulation.

Sensitivity has also been assessed for populations of different ages, with elderly people demonstrating elevated thresholds for vibrotactile stimulation at FA II mediated frequencies (i.e., those most often targeted by vibrotactile displays). Thus, age is a significant factor in haptic interaction design. As in other areas of haptic communication, such differences may be compensated by learning on the part of users, or by plasticity effects, whereby repeated exposure over time has been found to improve vibrotactile discrimination.

Distinctive functional characteristics of the foot relative to the hand include the reduced prehensile dexterity of the former (which is reflected in the kinds of activities in which it is involved), and the fact that static and dynamic forces on the feet during stance are higher and more sustained than those in the hand (i.e., on the order of 100 to 1000 Newtons in the former case). Thus, while the thresholds measured were assessed as subjects were lying down or otherwise off their feet, when individuals are walking, those thresholds may be higher, due to adaptation effects resulting from the large forces involved. As in the case of the hand, most of the receptor types of the foot are simultaneously active during normal motor activities, unlike the more segregated responses that are observed to accompany simpler cutaneous stimulation by static probes, vibrators, or electrodes. Vibrotactile stimulation of the foot can lead to a transformation of physiological messages potentially leading to the overestimation of static forces through co-activation of SA I afferents.

As a result, the application of extrinsic vibrotactile stimulation can result in unintended behavioral modifications affecting posture and gait. Various proprioceptive illusions thus could be induced by vibrotactile stimulation. Humans on foot are implicitly engaged in a sensorimotor task (e.g., quiet stance or normal walking). The cutaneoustactile channels addressed by these types of interfaces are active in the peripheral regulation of balance and locomotion through reflexes coordinating stimuli felt through the feet to muscles in the leg and foot. During locomotion, the coupling of motor reflexes to cutaneous stimulation depends on both stimulus properties and on the instantaneous gait phase at the time of stimulation.

There has been much recent interest in the observation that it is possible to enhance sensation in the feet, and thereby postural and gait control, by providing sub threshold noise to the foot soles. This effect is seen as significant for elderly populations, and for others with peripheral neuropathies.

While there has been little research on the design of haptically actuated floor surfaces, much may be learned from past work in areas such as the passive haptic design of ground surfaces, tactile feedback in foot-based human computer interaction, and locomotion interfaces for virtual environments.

Public transit areas, such as urban sidewalks, pose ample risks to pedestrians under normal sensory conditions. For people with visual impairments, the dangers are amplified, in part because they cannot make use of visual cues or signs that are the most common means of marking hazards (e.g., at intersections). Tactile ground surface indicators consist of regularly textured areas of ground, in the form of patterns of raised domes, bars, or other bumps, arranged on the sidewalk to mark significant paths or points of safety. While international specifications for such markers remain to be established, they must be clearly identifiable, without being obtrusive. When higher than about 5 mm, they have been found to pose risks for stumbling or falling. Alternative means of demarcating floor areas have been proposed to remedy this. For example, the discrimination of floor areas by elasticity, was suggested as a substitute for ground surface indicators.

One area of recent research has concerned the engineering of locomotion interfaces for virtual environments. However, this research has predominantly focused on the challenging problems of kinesthetic (movement) display via high-fidelity force-reflecting haptic interfaces, primarily for omnidirectional virtual walking experiences. Examples include omnidirectional treadmills and robotic foot platforms for simulating walking-in-place. The display of vibrotactile information (i.e., high-frequency force information) underfoot for the purpose of increasing immersion during locomotion in virtual environments has only recently begun to be addressed.

Shoes for conveying vibrotactile information non-interactively (i.e., independent of the actions of their wearers) have, for example, been investigated for information conveyance via non-intrusive or handsfree interfaces. These investigations have found that users were able to identify several families of haptic icons, consisting of moving patterns on the foot sole presented through an array of small vibration motors in the sole of a shoe-like apparatus. Despite the limited number of examples explicitly linked to the feet, there is ample evidence that information can be transmitted via body surfaces, through a range of devices, encodings, and under many different conditions. Beginning in the 1960s, some researchers systematically studied the use of tactile displays for communicating symbolic information via different parts of the body. Later research on sensory substitution aimed at conveying information about shape, spatial configuration, or environmental conditions near a user of a distributed tactile display; such displays were designed for body parts such as the tongue, forehead, thigh, or back.

Basic guidelines for stimulation by vibrotactile feedback are now being developed. Trends in recent research aim at uncovering central capacities for, and limitations on, tactile information, and at establishing a foundation for the design of large sets of structured vibrotactile messages, based on perceptual and usability. Although such guidelines necessarily depend on the display device, application, and user community addressed, basic strategies have been successfully applied to many different interfaces and sensory modalities.

There are many control interfaces for machine operation by foot (car accelerator pedals, dental equipment, sewing machines), and somewhat fewer for human computer interaction (foot controlled computer mice, sensing floors and shoes). Few of these have profited from active haptic feedback. Systems providing haptic warning cues via automobile's accelerator pedal have been researched for many years as means of improving driving safety, and implementations have now reached the market (e.g., Infiniti's Distance Control Assist). Haptic communication during a human control task conducted on a haptically augmented stair climbing machine has also been conducted. Some simple haptic cues supplied to the feet via an exercise machine were found to be effective at aiding participants in maintaining a target exercise level. The cues consisted of regularly spaced tapping sequences encouraging the person exercising to exert more effort when he or she slowed down. Vibrotactile interfaces for furnishing additional feedback during computer music performance, including vibrating floor tiles and in shoe stimulators have also been developed. While the feedback has been found subjectively effective at conveying spatial and temporal information, no systematic evaluation was performed.

There is therefore a need for providing efficient floor-based haptic communication systems, suitable for various types of applications.

SUMMARY

The present addresses the problem of haptic communication via floor surfaces in order to enhance or enable activities that involve movement on foot. The invention presents a system for vibrotactile feedback for haptically augmented floors which provide a user with vibrotactile feedback via a rigid surface under the feet. The system may be interactive or non-interactive. A user of the system may be wearing regular shoes.

In an aspect, the present provides a system capable of presenting structured vibrotactile information to the foot in response to data from sensors in a floor surface, via a rigid, vibrationally isolated surface that may be walked upon in the usual manner.

In another aspect, the present also provides a system to generate vibrotactile signals via a rigid surface, in response to data from sensors in the surface, so as to provide a perceptually convincing impression of a virtual ground material underfoot. In particular, how to do so in a way that resembles how a natural ground material produces vibrations in response to a footstep or other foot-ground contact interaction.

In yet another aspect, the present further provides a system to generate a structured vibrotactile signal to communicate a symbolic cue to the sole of the foot in a manner that is perceptually matched to tactile sensory capabilities of the foot.

In another aspect, the present provides a system to render the experience of operating a virtual foot control, such as a switch or slider, via a rigid floor surface with integrated vibrotactile actuation and sensing.

In still another aspect, the present provides a system comprising a plurality of rigid floor surfaces so as to permit differentiated vibrotactile responses at different locations.

BRIEF DESCRIPTION OF THE DRAWINGS

In the following Figures, similar reference denote like parts.

DETAILED DESCRIPTION

Figure 1:
FIG. 1 illustrates an exemplary application of the present system for vibrotactile cues via the ground surface.

The present relates to floor-based haptic communication interfaces, and more particularly to a system improving current floor-based haptic communication interfaces and widening applications of floor-based haptic communication interfaces using stimulus design and timing of presentation.

Floor-Based Haptic Communication Interfaces Particularities

Floor-based haptic communication interfaces share many positive features that are characteristic of other kinds of haptic communication, such as being complementary to other modalities. Such displays can function well even when visual attention is occupied, or when the environment is noisy. Tactile displays can be an effective means of directing attention to a significant event or location, in the presence of task load or sensory distraction as information received through such a display need only be apparent to its user. Haptic communication via floor interfaces may, in addition, offer some specific advantages, such as reflecting the near universal presence of foot-floor contact in human environments and while people may be averse to touching certain objects in public spaces such as restrooms, floor surfaces are broadly acceptable to touch, as shoes protect the feet. Also, floor-based interfaces do not require users to possess or wear any special technology, making them accessible to a wide range of users. Such a floor-based haptic communication interface may be positioned at a location (such as a pedestrian crossing) in such a way that little visual or manual search is required to locate it. This can be an important advantage for users with visual impairments. Furthermore, such interfaces are also well suited to applications that involve pedestrian navigation, way finding, or location-based information display, and a floor comprising such a floor-based haptic communication interface may be used to actively enhance specific sensorimotor aspects of walking.

However, if a display is meant to be accessed during locomotion, careful consideration must be warranted of stimulus design and the timing of presentation. Such entanglements of tactile sensation in the feet and motor behavior confirm that constraints on the design of actuated floor displays are needed in order to avoid adverse effects on gait and stance. Certain applications might exploit such effects. For example, a person entering a dangerous area might stop more quickly if cued by a suitable vibrotactile warning signal from the floor.

Vibrotactile Stimulus Design

Floor-based haptic communication display, can be characterized in terms of temporal properties of the stimuli involved, and the user interactions, if any, that generate them. These qualities may be grouped into short-time properties of the vibrotactile signals being displayed, the manner in which they are patterned on longer time scales, and the type of interactivity afforded by the display and application.

Short-time properties are related to time scales smaller than about 200 ms, over which the stimulus may be thought to be relatively stationary or unitary. Signals with short-time properties are building blocks from which more complex stimuli may be built. They may be characterized by properties related to their frequency content, temporal extent, temporal amplitude envelope, or modulation that is applied to any of these. Alternatively, they might be designed by analogy to a physical event, such as an impact transient, with properties resembling hardness or resonance.

Low-level signals are profitably organized into structured temporal patterns. Such organization of low-level signals improves identifiability and increase perceptual information content in a set of stimuli. Frequency bandwidth and temporal resolution of a tactile channel limit the amount of information that can be encoded via short-time features.

In recent research on vibrotactile communication, musically inspired structures (motifs or rhythms) have been profitably used to design larger sets of vibrotactile icons that are perceptually well distinguished from each other. An alternative approach is to arrange low level signals to resemble a temporal pattern of a physical process, such as bouncing or breaking (for an example from an auditory perspective).

Properties related to an interaction itself refer to the manner in which vibrotactile signals are generated in response to user actions, as captured through sensors of a device. Properties of an interaction are determined by a sensing method or system used, and the way in which the resulting data is used to control synthesis of the vibrotactile signal. According to the nature of this control mapping, the interaction is characterized as discrete or continuous. A continuous interaction gesture can be described as effective in a gestural typology if the vibrotactile signal is generated in a way that energetically increases with the energy of users' actions. Furthermore, stimuli can be synthesized as if generated by a virtual physical system, such as a bed of gravel, which is meant to be stepped upon.

The present approach extends a musical phrase metaphor that has been evaluated positively in recent literature on vibrotactile display (D. Ternes and K. E. MacLean. Designing large sets of haptic icons with rhythm. In Proc. of Eurohaptics, 2008), (L. M. Brown, S. A. Brewster, and H. C. Purchase. Tactile crescendos and sforzandos: Applying musical techniques to tactile icon design. In Proc. of the ACM 2006 Conference on Human Factors in Computing Systems, 2006), (J. B. F. van Erp and M. M. A. Spape. Distilling the underlying dimensions of tactile melodies. In Proc. of Eurohaptics, 2003).

In the present method and system, a stimulus is encoded in a rhythmic phrase, characterized by a set of notes each having a certain onset time, duration, and amplitude. A phrase is constrained to consist of two or more repetitions of a musical bar. The time domain of a single bar is quantized into 24 unit steps. A tempo is set, determining the total duration of a bar (in seconds). Notes can begin at any step and possess durations given by integer numbers of steps. Only a single note is allowed to play at any time. The amplitude of each is specified at its onset. Notes within the pattern of a given vibrotactile signal differ only in their amplitudes and durations, so that all possess the same short time parameters (e.g., frequency and roughness). The present method and system limit a number of parameters that must be specified for each stimulus. The system and method synthesize note level signals.

Such vibrotactile signals were used in an experiment that will be described later.

Wave Shaping Synthesis

Short-time stimuli is based on specification of basic signal properties affecting a frequency content, duration, amplitude modulation, and amplitude temporal envelope of a signal. A basic harmonic signal s(t) is composed of a sum of a fundamental sinusoidal component $s0(t)=\sin(w0 t)$ at angular frequency w0, and N harmonic components at frequencies wk=kw0. The desired waveform can be efficiently generated by a standard technique from audio synthesis, known as Chebychev wave shaping. s0(t) is passed through a static nonlinear transfer function $w(x)=åk\ akTk(x)$, where ak are desired harmonic amplitudes, and Tk(x) is a kth Chebychev polynomial. The result gives the desired harmonic signal s(t) as:

$$s(t)=w(s0(t))=åk\ akTk(s0(t)) \quad (1)$$

$$N-1\ åk=0\ ak\sin(wkt) \quad (2)$$

Using this method, it is simple to design a waveform which energy lies within a target frequency band, centered on approximately 250 Hz. A complete short-time waveform y(t) is obtained by multiplying the harmonic waveform s(t) by an amplitude envelope function e(t) with desired starting time $t_s$, duration T, amplitude A, attack and decay times $t_a$ and $t_d$. Finally, it is subjected to form of roughening, via amplitude modulation with a signal $r(t)=1+mr\sin(2p\ frt)$ of frequency $f_r$ and modulation depth $m_r$. That is, y(t)=s(t)e(t) r(t).

Synthesis of Virtual Impact Transients

An alternate method used to synthesize short-time stimulus components is based on virtual impact events, consisting of transient forces generated by a collision of two virtual elements: an exciting, but non-resonant object, termed a hammer, and a resonant object, termed a sounding object, as discussed by Rocchesson and Fontana (D. Rocchesso and F. Fontana, editors. The Sounding Object. Edizioni di Mondo Estremo, Florence, Italy, 2003). An impact force F(t) is generated by an efficient, physically based synthesis model obtained from a simplified version of Hertz' law, known as a Hunt-Crossley model. It is obtained by numerically integrating an differential equation:

$$F(t)=kx(t)a-Ix(t)a\cdot x(t), \quad (3)$$

where: x(t) is a compression displacement and $\cdot x(t)$ is a compression velocity. An impact force has parameters governing stiffness k, dissipation I, and contact shape a. This force is provided as an input to the resonant sounding object. The latter is modeled as a set of N resonant filters operating in parallel, with a combined impulse response given by:

$$y(t)=Nåi=1\ aie-bit\sin(wit) \quad (4)$$

and determined by a set of parameters governing modal amplitudes ai, decay rates bi, and resonant angular frequencies wi.

Figure 20:
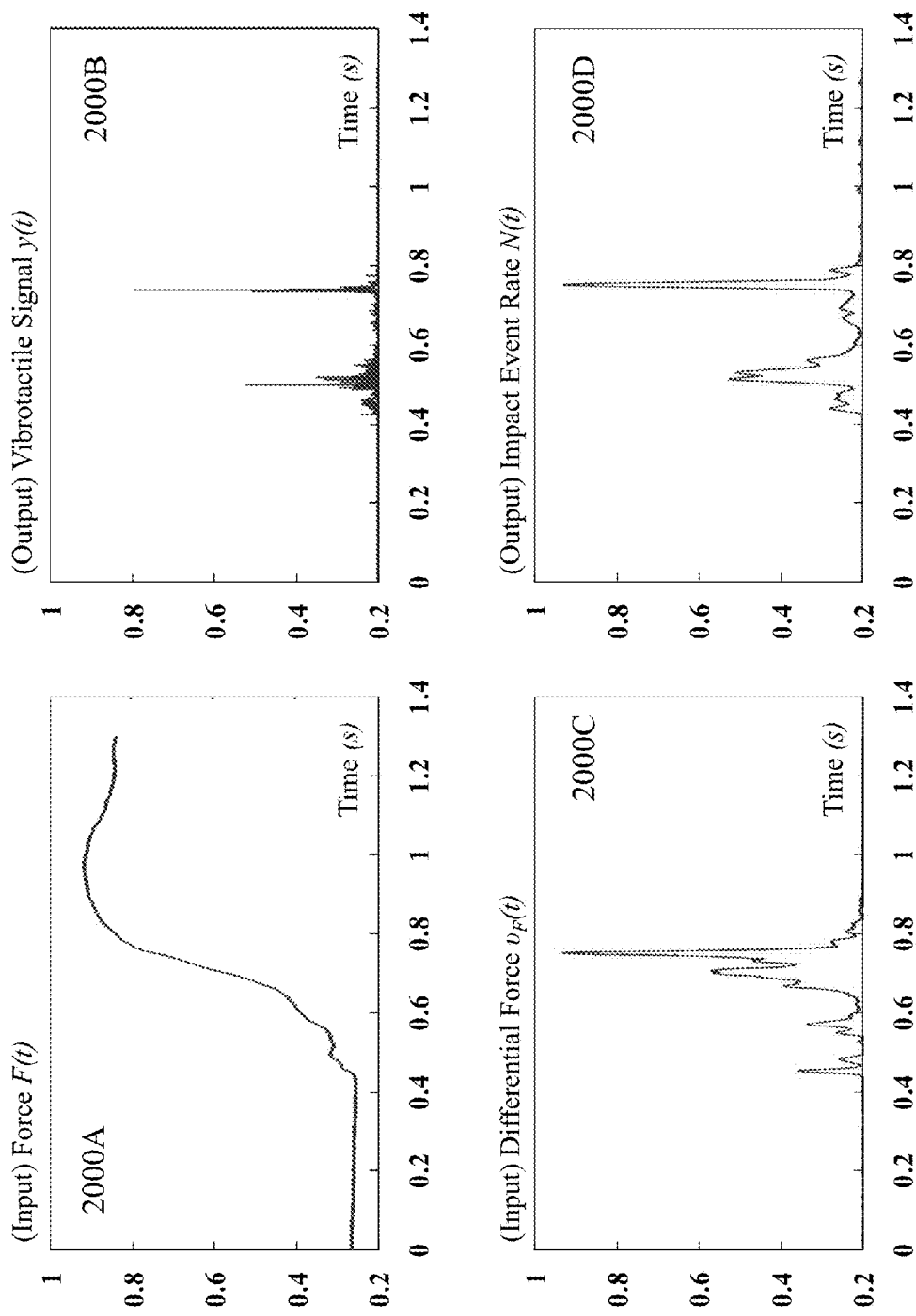
FIG. 20 is a graph depicting representative previously disclosed results for a single footprint measurement taken on gravel.
Figure 21:
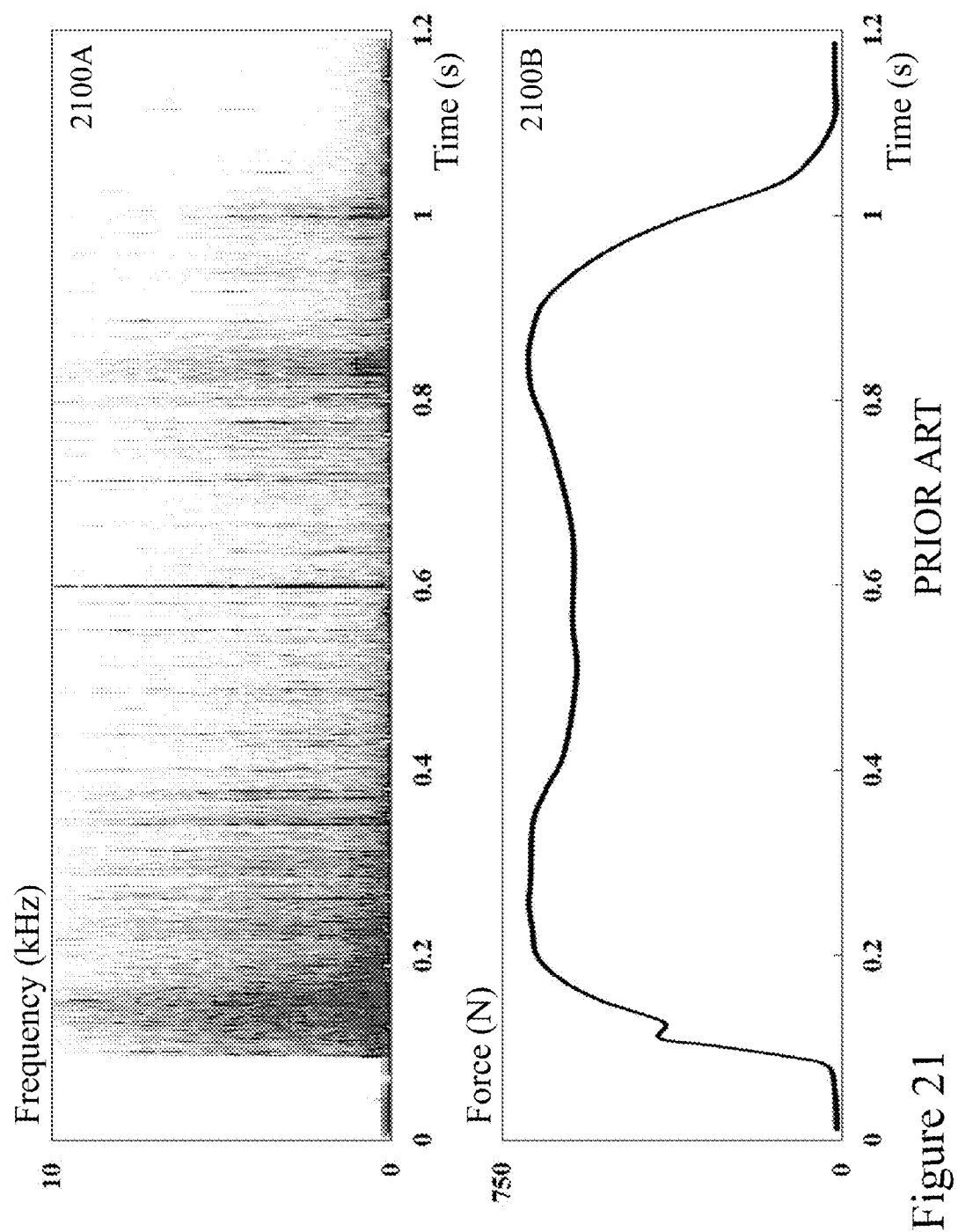
FIG. 21 is a graph depicting previously disclosed vibration spectrogram a(t,f) and normal force F(t) measured from one footstep onto rock gravel.

An impact event is synthesized by initializing Formula (3) with a desired velocity vl of impact and subsequently integrating a composite system in time. Reference is hereby made to D. Rocchesso and F. Fontana, editors, 'The Sounding Object. Edizioni di Mondo Estremo, Florence', Italy, 2003 for a more detailed discussion, including an overview of numerical implementation used, which is based on open source Sound Design Toolkit from the University of Verona. Referring to FIG. 20 there are depicted representative results for a single footprint measurement taken on gravel in first to fourth graphs 2000A to 2000D respectively. The differential force $v_F(t)$ bears a qualitative resemblance to the estimated impact event rate profile N(t). First to fourth graphs 2000A to 2000D correspond to FIG. 4 of Visell et al in "A Vibrotactile Device for Display of Virtual Ground Materials during Walking" (EuroHaptics 2008, Jun. 10-13, 2008). Consequently the sensed differential force exerted on a tile may be used as an input to the synthesis model, controlling the event rate, and the energy of the impacts. Now referring to FIG. 21 there are depicted first and second graphs 2100A and 2100B respectively a vibration spectrogram a(t, f) and normal force F(t) measured from one footstep onto rock gravel. First and second graphs 2100A and 2100B correspond to FIG. 3 of Visell et al in "Design of a Vibrotactile Display via a Rigid Surface" (Proc. IEEE Haptics Symposium, Mar. 25-26, 2010). Accordingly, impact events may be synthesized.

System

Figure 2A:
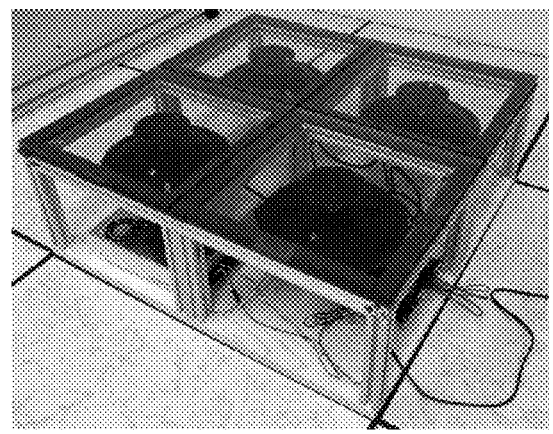
FIG. 2A illustrates an exemplary interactive, four-tile prototype.
Figure 2B:
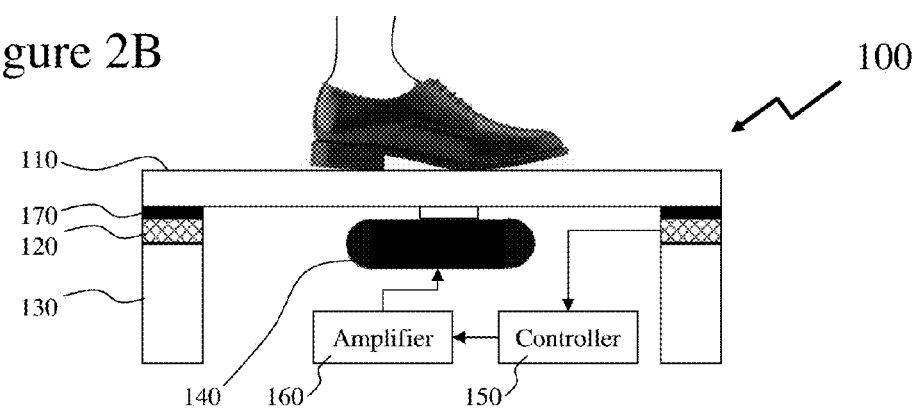
FIG. 2B is a schematic representation the present system.
Figure 2C:
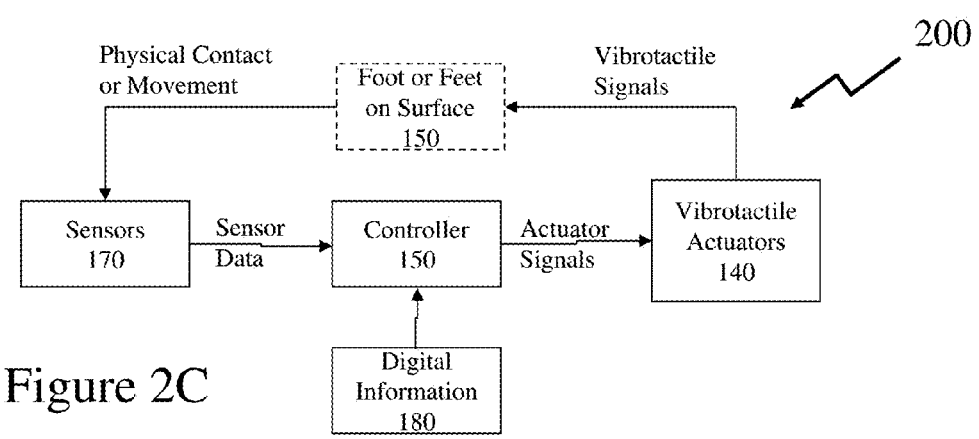
FIG. 2C is a schematic representation of the interactions between the various components of the present system.

The present relates to a system for providing vibration feedback to at least one foot. Reference is now made to FIGS. 2B and 2C, which respectively depict schematic representations of the present system 100, and of the interactions 200 between components of the present system 100.

The present system 100 comprises at least one rigid surface 110 for receiving the at least one foot of a user. The system 100 is not limited to one rigid surface 110, but could alternately comprise multiple rigid surfaces 110, either arranged in a line, in a matrix, spread across a larger surface, etc. Each of the rigid surface 110 could have various dimensions, varying from a couple of centimeters, to one or several meters. Although should as a square in the prototype of FIG. 2A, the rigid surface 110 is not limited to such a shape and could be shape differently, such as a rectangle, a triangle, a circle, an ellipse, a parallelogram, a lozenge, an hexagon, an octagon, etc. An outer area of the rigid surface 110, on which a user can put one or both feet, could be uniform surface, or bear markings. The rigid surface could be made of any of the following materials: solids, such as aluminum, steel, magnesium, metal alloys, polycarbonate, other plastics, concrete, wood, plywood, fiberglass; composite materials, such as sandwich panels constructed from a lightweight core material (e.g., balsa wood or aluminum honeycomb) and rigid facings (e.g., aluminum, steel, other metals, carbon fiber). In a particular aspect, the rigid surface 110 may correspond to a foot-operated device. Alternately, the at least one rigid surface 110 may represent a distinct floor, may be integrated and embedded within an object or an existing surface, such as for example a desktop, pavement, elevator flooring, bathroom flooring, etc.

A suspension mechanism 120 directly or ultimately receives and supports the rigid surface 110. The suspension mechanism 120 may be composed of elastic vibration mount material, or of any other mechanism capable of isolating vibration between the rigid surface 110 and a ground onto which the present system 100 is installed. The suspension mechanism 120 could comprise a plurality of components strategically affixed to supporting members 130, or support a perimeter of the rigid surface 110.

The system 100 further comprises one or several vibrotactile actuator(s) 140 for each rigid surface 110, depending on the size of the rigid surface 110. The vibrotactile actuator 140 is installed underneath the rigid surface 110 either directly to the rigid surface 110, or by means of a support system (not shown). The vibrotactile actuator 140 provides vibration feedback to a user through the rigid surface 110. The vibration feedback provided by the vibrotactile actuator 140 is controlled by a controller 150. An amplifier 160 is used between the controller 150 and the vibrotactile actuator 140 to drive the vibrotactile actuator 140. In the case where the present system is not interactive, the controller 150 provides a signal to the vibrotactile actuator 140 on a continuous basis, or during certain operating periods. Examples of operating periods include the following: day of the week, hours of the day, traffic hour, an event such a red traffic light, a yellow traffic light, a green traffic light, arriving of a train or metro, leaving of a train or metro, door opening of a train or metro, etc.

Figure 5:
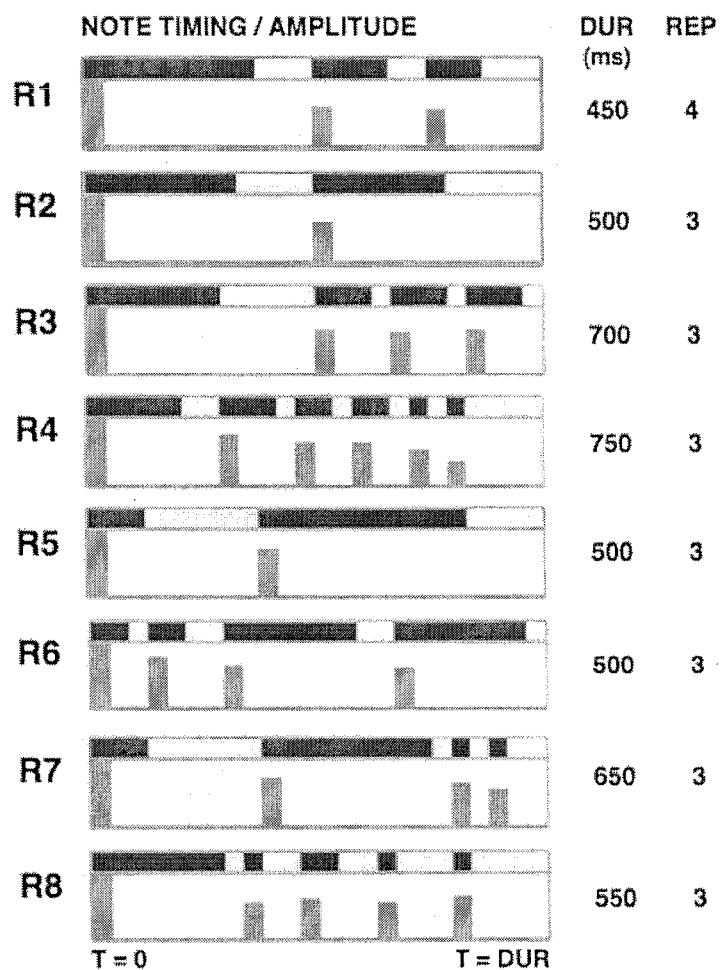
FIG. 5 represents eight rhythms (R1 to R8) over time from which stimuli in both experimental sets were built.
Figure 6:
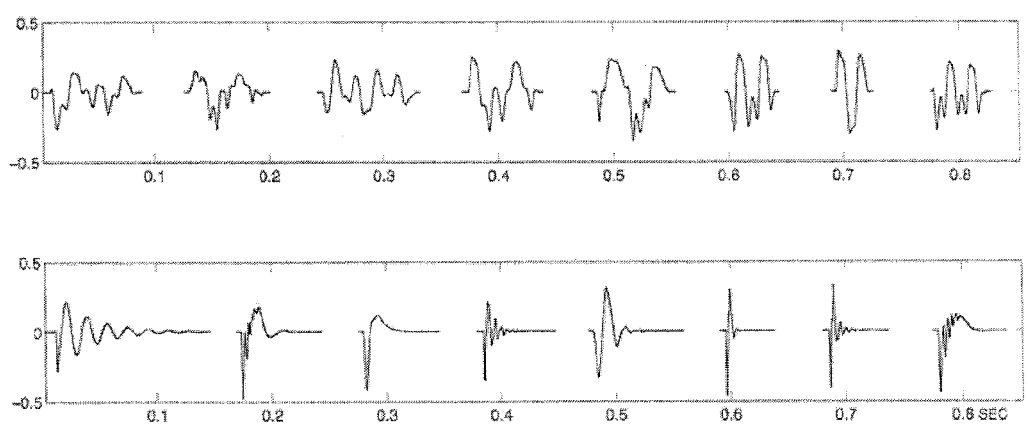
FIG. 6 graphically represents waveforms used to generate stimuli for each of the eight rythms of FIG. 5, using WS and IT techniques.
Figure 7:
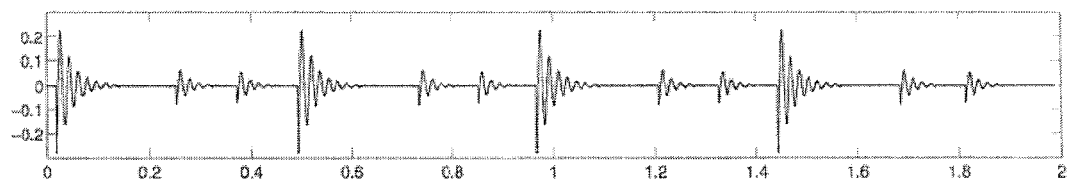
FIG. 7 presents an example of a stimulus used during an experiment, resulting from model settings, which produced a first "impact" waveform of FIG. 6 in combination with a first rhythmic pattern of FIG. 5.

The vibrotactile actuator 140 is adapted for providing structured vibrotactile signals composed of abstract elements (such as a sum of sinusoids with a certain temporal envelope) resembling musical notes, and arranged in a rhythmic pattern (i.e., a tacton), examples of which are depicted in FIGS. 5 and 6.

In a particular aspect, the vibrotactile actuator 140 is adapted for providing the vibration feedback across a wide frequency range. For doing so, each vibrotactile actuator 140 may further comprise an active digital inverse filter to render vibration stimuli transparently across an entire frequency range without artefacts. The vibrotactile actuator 140 may be used for conveying various types of information such as for example: an information indicator, a warning signal, or other type of digital information.

The controller 150 may consist or a separate microprocessor with a corresponding software for each rigid surface, or of a microprocessor with a corresponding software adapted for controlling multiple vibrotactile actuators 140 concurrently. The controller 150 provides commands to the vibrotactile actuator 140 on the vibrotactile feedback that must be generated. Various types of vibrotactile feedbacks may be created, such as vibrotactile feedback based on a musical phrase metaphor, upon the synthesis of rhythmic patterns of virtual physical events such as impact transients, etc. as previously discussed.

In another aspect, the controller 150 provides commands to the vibrotactile actuator so that the vibrotactile feedback generated resembles a vibration signature resulting from a physical object, such as a hammer, tapping with a rhythmic pattern on the underside of the rigid surface 110. These representational coded signals may be thought of as tactile icons.

When the present system 100 is also used for interactive feedback, the present system further comprises at least one sensor 170 per rigid surface capable of interactive feedback. For example, in a system comprising multiple rigid surfaces 110, some of the rigid surfaces may further comprise one or several sensors to provide interactive feedback, while other rigid surfaces do not comprise sensors. For each rigid surface adapted for providing interactive feedback, one of several sensors 170 are thus used. The sensor(s) 170 detect(s) when pressure is applied against the corresponding rigid surface 110 and reports the detected pressure to the controller 150. The sensor may consists of any of the following: a floor-based force sensor, a touch sensor, a capacitive sensor, or any other type of sensor capable of detecting when pressure is applied against an exterior of the rigid surface 110. In an alternate aspect, a plurality of different sensors may be used for one same rigid surface 110, so as to provide different type or granularity of information. The controller 150 receives the detected pressure, and triggers the vibrotactile actuator 140 corresponding to the rigid surface 110 for which pressure was detected, so as to provide corresponding vibrotactile feedback. The controller 150 may be designed in such a manner that vibrotactile feedback is provided only upon application of the pressure, and not when the pressure is maintained on the rigid surface 110, for example when a user stands on the rigid surface. Furthermore, the controller 150 may further be adapted to determine location and magnitude of pressure exerted by a foot or a displacement across a large rigid surface or a plurality of rigid surface representing a distributed floor area, based on the pressure detected by the plurality of sensors from different corresponding rigid surfaces 110.

When a user moves along a series of rigid surfaces 110, the at least one sensor 170 corresponding to each rigid surface 110 being stepped on reports detected pressure to the controller 150. The controller 150 receives the detected pressure and triggers each vibrotactile actuator 140 corresponding to the series of rigid surfaces 110 being stepped on to provide vibration feedback accordingly. This implementation provides co-located touch and vibration feedback during movement on foot on the plurality of rigid surfaces 110. The vibrotactile feedback could further be accompanied by corresponding auditory or visual feedback, provided by the controller 150 to a separate speaker (not shown) or to the vibrotactile actuator 140, and to a screen (not shown) or a projector for projecting on the corresponding rigid surface 110. By providing concurrently visual feedback, the present system may further provide a floor-based touch screen. Visual indications such as buttons, sliders or widgets could further be projected and actuated by a user by pressing the desired projecting visual indicator, corresponding to a particular rigid surface 110 or combination thereof, where the pressure detecting by the corresponding sensors 170 are recognized by the controller 150 as a selection or an action by the user.

In another aspect, the controller 150 is a force-acceleration controller for controlling the vibrotactile actuator 140 to produce simulated realistic natural ground materials or situations, such as for example: snow, ice, gravel, sand and earth.

In a further aspect, the controller 150 is adapted to provide a command to the vibrotactile actuator 140 that corresponds to the applied force exerted by a footstep with a signature approximating that of a natural ground material, such as gravel or snow. This vibrotactile feedback is highly dependent upon the pressure detected by the sensor on the rigid surface 110 upon which the step is executed in time. This particular aspect is described in Y. Visell, J. Cooperstock, B. L. Giordano, K. Franinovic, A. Law, S. McAdams, K. Jathal, and F. Fontana. A vibrotactile device for display of virtual ground materials in walking. In Proc. of Eurohaptics 2008, 2008, a publication by the inventors which is herein incorporated by reference.

A user of the present system may or may not be wearing shoes.

Thus present system generates a structured vibrotactile feedback to communicate a symbolic indicator to the sole of the foot in a manner that is perceptually matched to tactile sensory capabilities of the foot. In another aspect, the present system further provides the experience of operating a virtual foot control, such as a switch or slider, via a rigid floor surface with integrated vibrotactile actuation and sensing. Furthermore, the present system permits differentiated vibrotactile responses at different locations in a distributed floor area formed by a plurality of rigid surfaces 110.

The electronic components necessary for developing the present system 100 comprise vibrotactile transducers, amplifiers, and signal generation circuitry provided for example by means of a computer with an associated digital to analog converter. Among the distinguishing technical requirements are the relatively higher power demands, owing to both the elevated vibrotactile sensory thresholds in the feet relative to those in the hand, and to the requirement of actuating a floor surface bearing a large mass.

Among other commercially available vibrotactile actuators 140, a suitable choice is a linear voice coil motor. It consists of a metallic mass suspended on an elastic structure between coils of an electromagnet, which, when driven, exerts a force directly against a structure to which it is attached. An advantage of these actuators is that they provide independent control over amplitude and frequency, which is not the case for simpler devices, such as eccentric mass motors commonly used in mobile phones. A second advantage is that the entire actuator may be concealed. Several other commercially available voice coil actuators can be used with present system, as long as the selected voice coil actuator selected possess a usable frequency bandwidth overlapping all or most of the region of sensitivity of FA II receptors in the feet. Such actuators can readily be driven with normal audio amplifiers.

Some of the considerations when implementing the present system comprise determining whether the system is to be integrated with an existing feature or device (e.g., an area of tactile ground surface indicators), or if it is to constitute a new artifact, such as a custom-built floor platform, whether the interaction is to be afforded to a single person or to a group, the required spatial resolution, the level of interactivity needed and the level of independence of stimulation be afforded to each foot.

Such considerations can only be addressed in detail through a particular design of the present system. Some technical simplifications are made possible by presenting vibrotactile stimuli via a rigid, actuated floor surface. This approach facilitates the protection of all electronic components beneath the surface of the floor. Also, the size of the surface being actuated means that if it is driven at frequencies extending into the audible band, usable auditory feedback can be supplied through the same interface, allowing for cross modal information communication. Since vibrations above about 1000 Hz are not felt, higher frequency signal components may, in part, be shaped so as to improve auditory feedback. While this feedback has been found usable in practice, there are significant limitations arising from structural resonances and emission characteristics of the present system. In some cases, a stimulus may be supplied through the rigid surface in a way that is conditional upon, or computed as a function of, forces supplied by a pedestrian stepping onto the rigid surface. For example, the rigid surface may be configured to provide a response resembling a (virtual) foot switch, controlled by foot pressure, as shown on FIG. 4D. Interactivity may be enabled via an array of sensors embedded in the system.

Despite the coupling between actuator 140 and sensor 170, the forces supplied by the former are often negligible, because the magnitudes involved (on the order of a few Newtons or less) are much smaller than the low-frequency forces exerted by pedestrians against the ground (i.e., as large as 1000 Newtons). Although actuator 140 size or other constraints may dictate a coarse spatial arrangement of actuators (distributed with a spacing of one or several feet in distance) this need not necessarily be apparent to a user. A stimulus is generally felt through each area of the foot in proportion to the force it provides to the vibrating surface. Thus, even though the spatial density of actuators may be very coarse, the resulting experience is that the stimulus originates at the locus of foot-floor contact. The effect is similar to that used to virtual tactile buttons on touchscreen displays. For similar reasons, boundaries between individual tiles are less noticeable than might be expected, provided similar responses are supplied by adjacent rigid surfaces.

Distinguishing advantages of the present system includes its applicability to a wide range of settings and environments, its ready accessibility to anyone on foot, and its potential for seamlessly presenting dynamic information linked to a specific location, navigational or locomotor task.

In addition to the system described in details herein, the present includes the series of earlier prototypes to pedestrians standing or walking upon it, described in (Y. Visell, J. Cooperstock, B. L. Giordano, K. Franinovic, A. Law, S. McAdams, K. Jathal, and F. Fontana. A vibrotactile device for display of virtual ground materials in walking. In Proc. of Eurohaptics 2008, 2008), and in (Y. Visell, J. Cooperstock, Design of a Vibrotactile Display via a Rigid Surface. In Proc. Of IEEE Haptics Symposium, 2010), and in (Y. Visell, S. Smith, A. Law, R. Rajalingham, J. R. Cooperstock, Contact Sensing and Interaction Techniques for a Distributed, Multimodal Floor Display, Proc. Of IEEE 3D User Interfaces, 2010), which are incorporated herein by reference.

INDUSTRIAL APPLICABILITY

Floor surfaces already play roles that intimately link tactile sensation in the feet to our everyday activities. The use of such surfaces as displays for active haptic communication is an interesting concept, and one that naturally extends accepted areas of practice in the design of haptic information for ground surfaces. Floor-based haptic communication displays may be used for various applications, such as location-based information displays, display of navigation salient information, functional augmentation of features or devices, rehabilitation, etc.

Due, in part, to the commonality of foot-ground contact, such a device may be suited to providing location-based information display for notifications about a current or future events associated with a location (e.g., the arrival of a bus at its stop), or of informing about an ongoing process.

Such a device could also be highly suited for display of navigation-salient information to demarcate a location or region of interest to pedestrians (e.g., a crosswalk location, or an in store promotion), a direction or directions of interest, or for indicating a pedestrian path or passage (e.g., the route to an nearby emergency exit).

In interactive settings, floor-based haptic communication displays may be used for supplementing the functionality of existing architectural features (e.g., steps, entrances, stairs, tactile ground surface indicators) or interfaces (e.g., foot switches, haptic locomotion interfaces, exercise machines. For example, an interactive map may be presented to users via a floor surface, providing tactile feedback to enhance the experience of activating its touch gestures or controls via the feet. Interactive floor-based haptic communication system may also be used for diversion, comfort, entertainment or in the context of artistic creation, for example, by silently providing a common tempo to musical performers, or by communicating information to a computer music performer.

Cutaneous tactile stimulation via the soles of the feet can be designed to improve locomotion during rehabilitation or normal activities. By simulating the vibrations felt by the feet during stepping on natural materials, the present system can robustly create the perception that users are stepping onto a surface that is softer (less stiff) than it actually is, potentially eliciting compensating movements (such as higher stepping) that can reduce the likelihood of falling in persons that might otherwise be at risk. Similarly, the present system could also be used to present warning signals that provoke reflexes meant to avert a pedestrian from stepping in the path of danger, or for simulating natural ground surface features (e.g., earth, sand, stone) for virtual reality or augmented reality simulations that involve movement on foot.

The present floor-based haptic communication display could alternately be implemented to introduce novel features at theme parks. Attendance at such parks is a major source of revenue. A significant factor affecting their usability is the long lines at their most popular ride-based attractions (1 to 2 hour lines are not uncommon). Consequently, these parks are motivated to implement entertaining attractions that either mitigate the annoyance of standing in line, or provide alternative activities to limited-admission rides.

Many everyday ground surfaces could also be profitably augmented with the present floor-based haptic communication display. Such displays might find roles that are complementary to those that have been explored in the mobile computing domain. Some exemplary simple end-user scenarios comprise the example of FIG. 1, which depicts use of the present system for a crosswalk at which pedestrians receive vibrotactile cues via the ground surface (shown as shading around the feet), indicating the location of the crossing and state of the signal. Similar systems could also be used as follows: a visually impaired pedestrian traveling to an appointment on foot and by public transportation, reaching a noisy urban crosswalk, inferring via a vibrotactile cue received near a curb, that a crossing signal is red, and later receiving an indication that it is now safe to cross. Upon entering the subway, a haptic feedback supplied near the platform edge indicates that the train has not arrived. Once the train arrives, another cue indicates the locations of the train doors. The pedestrian reaches the building of an office, and locates the elevator. While ascending to her destination, she receives a vibrotactile cue from the elevator floor, indicating the floor number that has been reached, and instantly knows when to disembark.

In another scenario, an elderly person taking a shower in his home receives subtle vibrotactile feedback to his feet, unconsciously aiding him in maintaining his balance in response to sensed shifts in his center of mass and pressure.

In yet another scenario, a rescue team is engaged in an augmented reality training simulation that aids them in learning to evaluate and respond to the changing conditions of a structure during an emergency. They receive realistic cues through the response of the present haptically actuated floor delivering signals appropriate to the material and local stability of the ground surface in the simulation.

Prototypes

Figure 3:
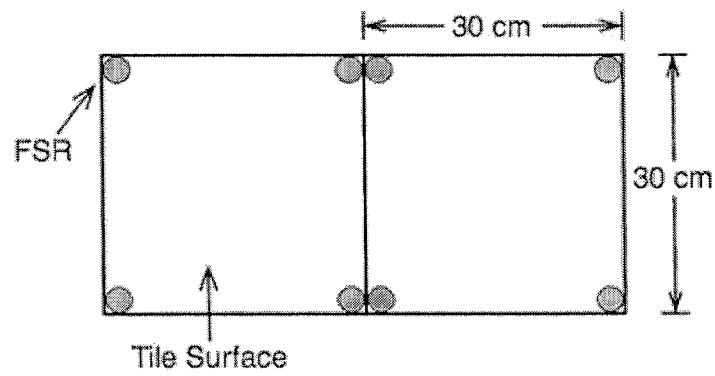
FIG. 3 is a schematic representation of a 2×1 tile prototype seen from above, with force-sensing resistors (FSR).
Figure 4A:
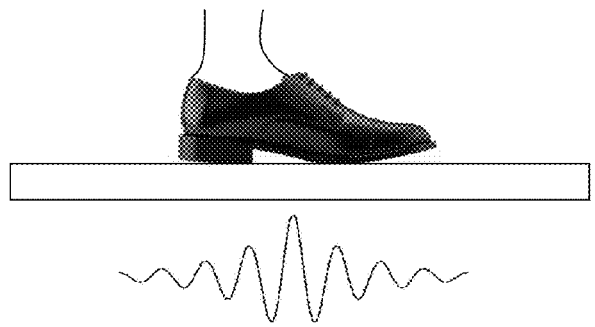
FIG. 4A represents a vibrotactile message designed using time and frequency domain waveform properties.
Figure 4B:
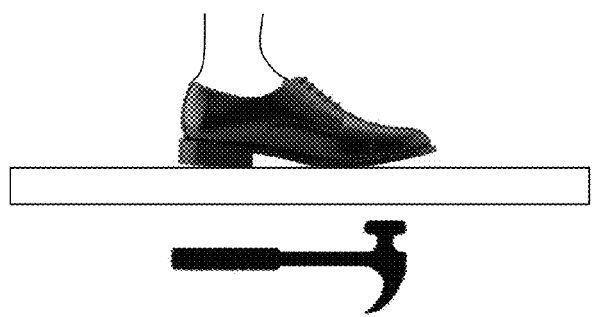
FIG. 4B represents a message derived from a model of a physical process, such as an object tapping on an underside of a tile.
Figure 4C:
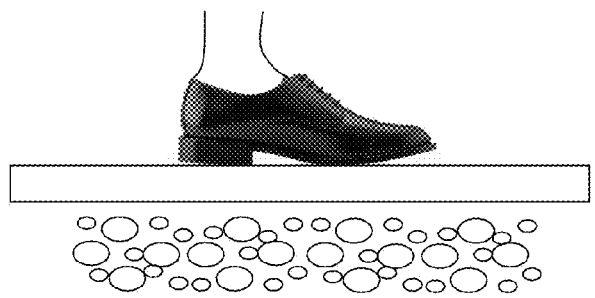
FIG. 4C represents a virtual physical material interaction, such as a step onto a bed of gravel.
Figure 4D:
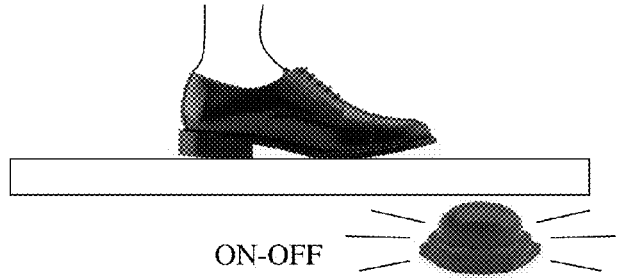
FIG. 4D represents a virtual switch.

A prototype of the present system was built and is depicted in a schematic representation in FIGS. 2 and 3. Four tiles of rigid polycarbonate of dimensions 30.5×30.5×1.25 cm were used. They rested on an aluminum substructure. A force sensing resistor (Interlink model 403) encased in foam rubber 0.5 cm thick was positioned under each of the four corners of each tile (as shown in FIG. 3). A vibrotactile actuator was rigidly attached to the underside of each tile via a steel-mounting bracket. In applications that were interactive, data from the force sensors was digitized and transmitted via a serial USB link to a personal computer that interactively generated the vibrotactile signals. The actuators were inertial voice coil motors (Clark Synthesis model TST-239). They were capable of driving the floor surface with a greater power (by a factor of about four) than is required for the tiles used here. They are also used to prototype applications in which much larger tile surfaces are driven.

Figure 14:
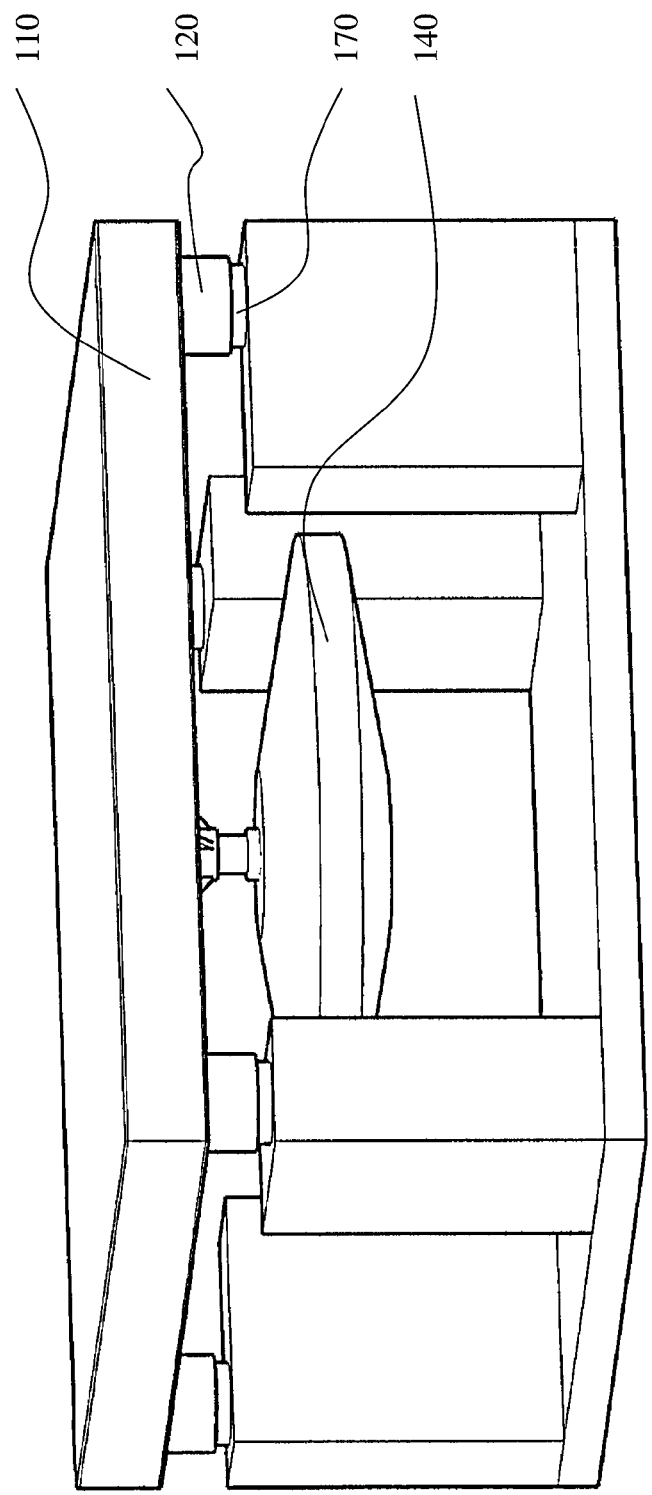
FIG. 14 is a schematic representation of a second prototype.

A second prototype was constructed based on an extensive analysis and redesign, accounting robustly for the structural dynamics of the system in such a way that it possesses a usable frequency range that is matched to perceptual capabilities of the feet, and integrating (in one embodiment) higher resolution industrial force sensors. The rigid surface consisted of a top plate commercially manufactured aluminum honeycomb sandwich panel component with dimensions 30.4×30.4×2.54 cm and a weight of 400 g. The panel had aluminum facings with a thickness of 0.08 cm. This material was selected for its high bending stiffness to weight ratio. The panel sides were closed with a basswood frame to eliminate acoustic emissions or deformations that otherwise result from small deflections of the honeycomb at the edges of the panel. The plate was supported by cylindrical SBR rubber elastic elements, forming the suspension mechanism, positioned as shown in FIG. 14. In dynamic or multi-tile configurations, a retaining socket surrounding the elastic support (not present in the figure) was used to keep the plate from changing position. The actuator was mounted via an aluminum bracket bonded to the center underside of the plate. Positioning the force sensors beneath the plate is feasible, since the bandwidth of the force applied to the plate by the user was limited. Although not essential, the sensors were furthermore positioned beneath the elastic suspension of the device, so as to better isolate them from the actuators. Force sensing was performed via four load cell force transducers located below the vibration mount located under each corner of the plate. In a second configuration, four low-cost resistive force sensors were used in place of load cells. After conditioning, the response of these lower cost FSR sensors to an applied force was nonlinear, and varied up to 25% from part to part (according to manufacturer ratings). Consequently, a measurement and subsequent linearization and force calibration of each was performed, using a calibrated load cell force sensor. After such a calibration, a linear response accurate to within 5% could be obtained using low cost parts such as FSRs. An extensive analysis of the structural dynamic response of the device was undertaken, through the construction of a theoretical physical model and Finite Element Method simulation, and components were thereby optimized, ensuring a usable frequency range in this prototype embodiment extending from 50 to 750 Hz. An optimal digital inverse filter was computed from measurements so as to guarantee a neutral, transparent frequency response across the entire usable frequency range, as graphically depicted on FIG. 15.

Figure 15:
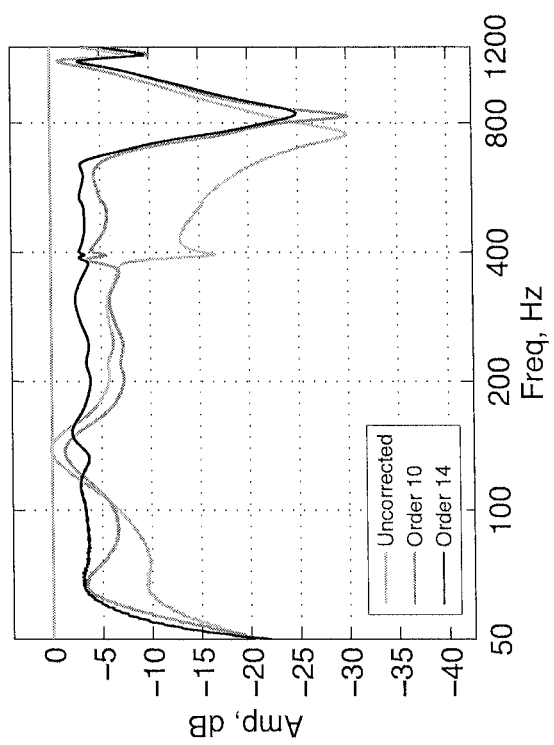
FIG. 15 is a graphical representation of frequency response of uncorrected and corrected components.
Figure 16:
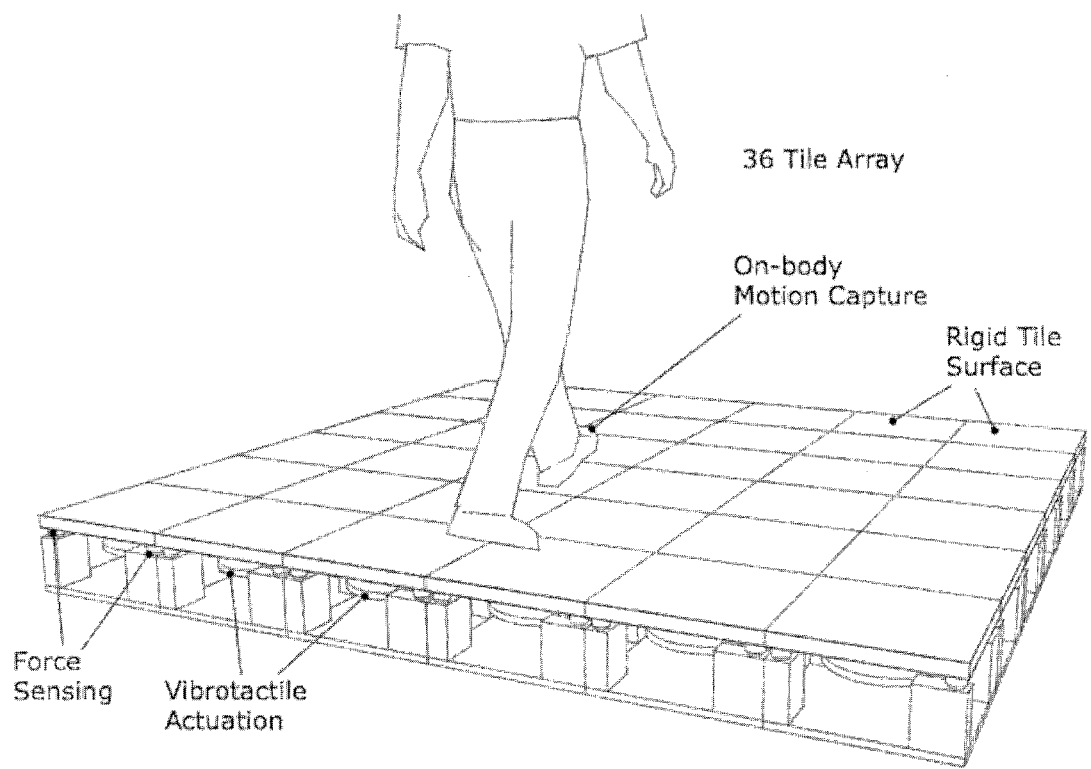
FIG. 16 is schematic representation of a top view of a third prototype.
Figure 17:
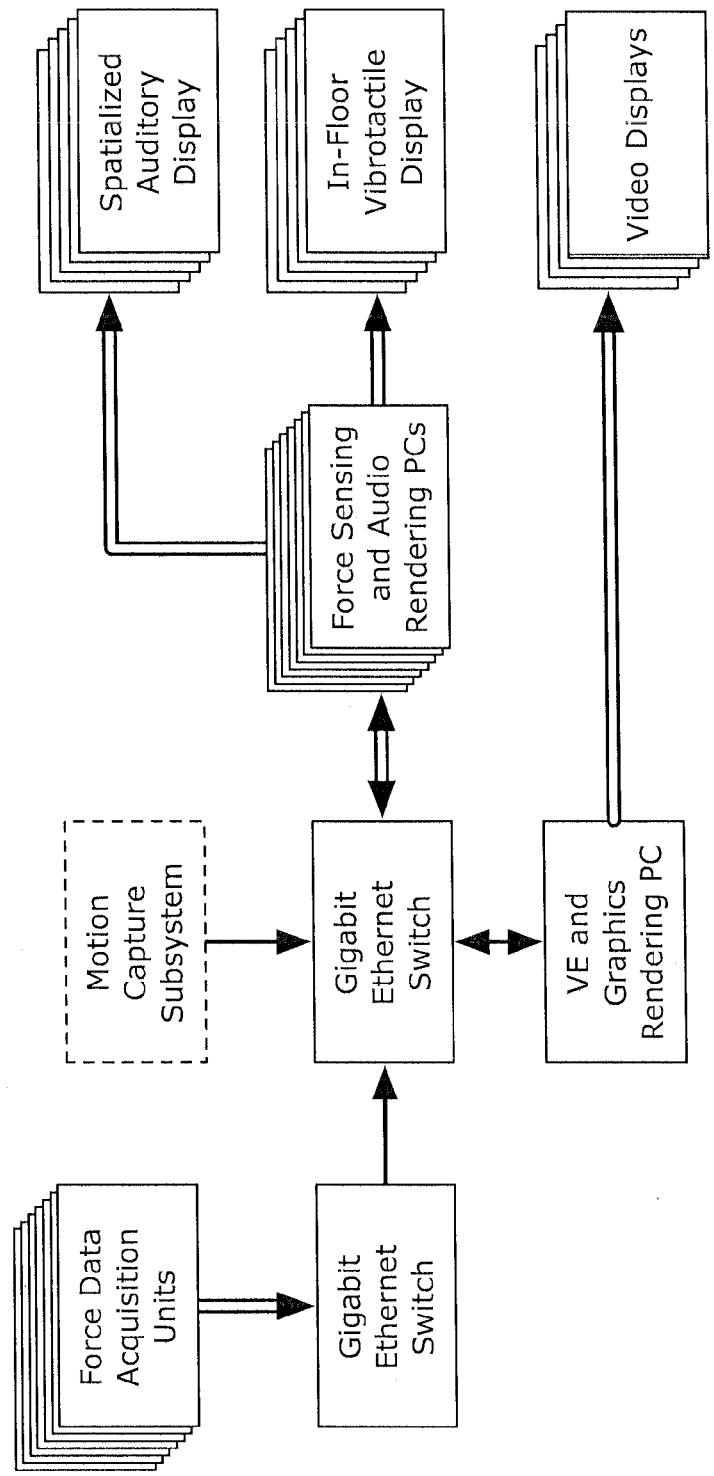
FIG. 17 is a schematic representation of a system corresponding to the third prototype.

A third prototype was constructed consisting of a square array of 36 rigid tiles, each of which was instrumented with force sensors (four per tile) and a vibrotactile actuator, and integrated in an immersive virtual environment simulator (FIGS. 15 and 16). The tile design in this prototype embodiment corresponded to the second prototype described above. Analog data from the force sensors was conditioned, amplified, and digitized via 32-channel, 16-bit data acquisition boards. Each sensor was sampled at a rate of up to 1 kHz transmitted over a low-latency Ethernet link. An array of small form factor computers was used for force data processing and audio- and vibrotactile-signal rendering. A separate, networked server was responsible for rendering visual feedback and managing user input. A separate server was used to abstract the hardware implementation, extract contact interaction data, and implement the user interface (material simulation, touch screen display, or similar).

Examples of components used to design the previously described prototypes are now presented. The actuator that was used is Clark Synthesis model TST-439 (Platinum), which has a nominal impedance of 6 Ohms, a nominal power handling of 100 W RMS, a usable frequency range of 20 Hz to 20 kHz, and a maximum force greater than 50 N between 40 Hz and 1000 Hz. One of the sensors used was an Interlink Force Sensing Resistors with a range effectively infinite (electronics are the limitation), and a practical range of 0.1 Newton to 10000 Newton (10 grams to 1000 kg).

The required specifications for the actuator has a minimum usable frequency range: 100 Hz to 300 Hz (estimated), an ideal usable frequency range between 50 Hz to 800 Hz, and a maximum force that is greater than 30 N and between 40 Hz and 1000 Hz. The required specifications for the sensor is a minimum force range from 10 Newton to 1000 Newton, and an ideal force range between 0.1 Newton to 1000 Newton.

EVALUATIONS

Two groups families of evaluations of the capabilities of the devices described here, based on experiments with more than 50 human subjects. The first set of evaluations addressed the extent to which vibrotactile signals presented through the floor interface are recognizable and memorable to users, and related aspects of their usability. The second set of evaluations directly supports claims that the invention is capable of simulating material properties of natural ground surfaces, in highly non-obvious ways, notably by providing perceptually realistic simulations of ground surface compliance (softness) via vibration channels alone, without (costlier, and more complex) low-frequency force feedback.

Evaluation 1

Identifiability and Usability of Vibrotactile Information

An evaluation of the present system for vibrotactile information via floor surfaces that was prototyped has been conducted. The aim was to determine whether vibrotactile signals designed in two different ways could be distinguished when presented via a floor surface. Two sets of eight signals were designed, one based on sinusoidal wave shaping synthesis and the other based on the synthesis of virtual impact transients respectively referred as WS set and IT set. Both sets were designed using eight underlying rhythmic patterns (shown in FIG. 5). The vibrotactile stimulus sets differed, therefore, only in the note-level signals from which they were composed.

To generate the stimuli used in the experiment, N=10 harmonics were used, with fundamental frequency f0 between 30 and 70 Hz, and a modulation frequency of fr=25 Hz. The harmonic amplitudes ak, the roughness mr, were set heuristically by the designer, as was the base frequency f0. Waveforms used in the experiments are shown in the top row of FIG. 6. FIG. 6 graphically represents waveforms used to generate stimuli used during evaluation, ordered as reported on in the experiment. Top: Those generated using wave shaping synthesis. Bottom: Those are generated using virtual impact transient model. The final stimulus sets result upon superimposing the rhythmic patterns.

The experiment assessed both the rate of correct identification and learning for the two stimulus sets.

Methodology

A total of 24 people aged between 20 and 39 years took part in the experiment. Twelve of them were male and twelve were female. 14 of them were university students. The experiment was designed with a single independent factor, resulting in each group of twelve participants being presented with the task of identifying stimuli from one set. A between groups design was used because the rhythmic content in the two stimulus sets is identical, so participants exposed to one set would be expected to perform better than otherwise expected with the second set. Each participant was given a pair of hard soled men's dress shoes in his or her size to wear during the experiment. Apart from size differences all the shoes were identical. The amplitude of vibration of the tile was adjusted as needed for each participant, depending on his or her ability to detect a reference vibrotactile noise signal.

At the beginning of the session, participants received instructions, together with an explanation and demonstration of the experimental interface and operation of the display. At all subsequent stages (except during pauses), participants were required to stand on the actuated floor surface, and to wear closed-ear headphones playing pink noise at loudness sufficient to mask the (generally low-level) sounds produced by the system. The software application used during the experiment ran on a personal computer, implementing the respective design method. In addition to the floor tile, an interface consisted of a graphical user interface with numbered buttons, one for each icon, presented on a computer monitor. Participants selected items in the graphical user interface using a mouse. The experiment was based on absolute identification of the 8 stimuli from the respective set, with a unique correct response required for each (the numerical identifier of the icon, ranging from 1 to 8). The same stimuli were used for all participants within a given group, but they were presented in random order in each session of the experiment, with a different ordering presented to each participant. After an introduction to the device and interaction method, participants were given five minutes of self-guided learning. During this time, they could select a numerical identifier and be presented with the stimulus corresponding to their selection.

The rest of the experiment was divided into six sessions. During each session, all stimuli were presented twice. Thus, overall, each participant was asked to identify every vibrotactile stimulus from their set a total of twelve times. Each session took less than about four minutes to be completed. Participants were allowed a short break between sessions, but in most cases preferred to continue so as to avoid forgetting the learned associations. Participants were presented with stimuli sequentially. At each presentation, they could press a button to play the stimulus up to four times before supplying a response. Feedback, in the form of the correct stimulus ID, was provided after each response was given. The reason for providing feedback was to facilitate the assessment of recognition after learning and rate of learning throughout the experiment.

RESULTS AND DISCUSSION

Identifiability and Usability of Vibrotactile Information

A log of the stimuli and responses was recorded throughout the experiments. Participants were also interviewed following the experiment. The stimulus sets used in the experiment included eight items, near the limit of what participants might be expected to retain in working memory. Training was limited, consisting of a maximum of, on average, 20 reinforced presentations of each stimulus at the end of the final session. The stimuli were not assigned any mnemonic, other than an arbitrary numerical index, that could be used to remember them. Although introducing a semantic association to each stimulus (for example, the name of a meaningful event) can be used to improve recall, good design of display and stimuli is a prerequisite to good performance. As the aim was to assess the suitability of the display methods behind these two stimulus sets, introduction of any external effects that might be associated to the choice of semantic labels was avoided.

Figure 8:
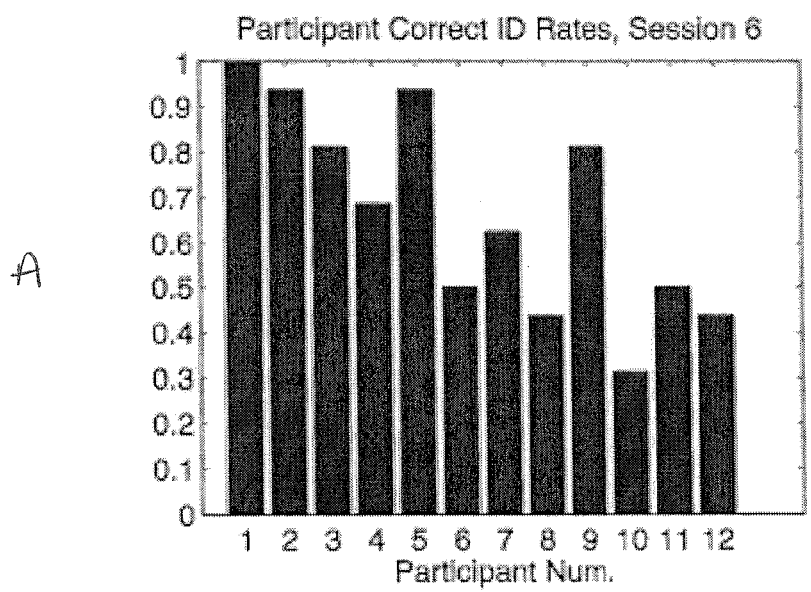
FIG. 8A graphically represents a correct identification rate for each of twelve participants in a group assigned to stimulus set IT, after 6 sessions of assessment with enforced learning.
FIG. 8B graphically represents a correct identification rate for each of twelve participants in a group assigned to stimulus set WS, after 6 sessions of assessment with enforced learning.
Figure 8:
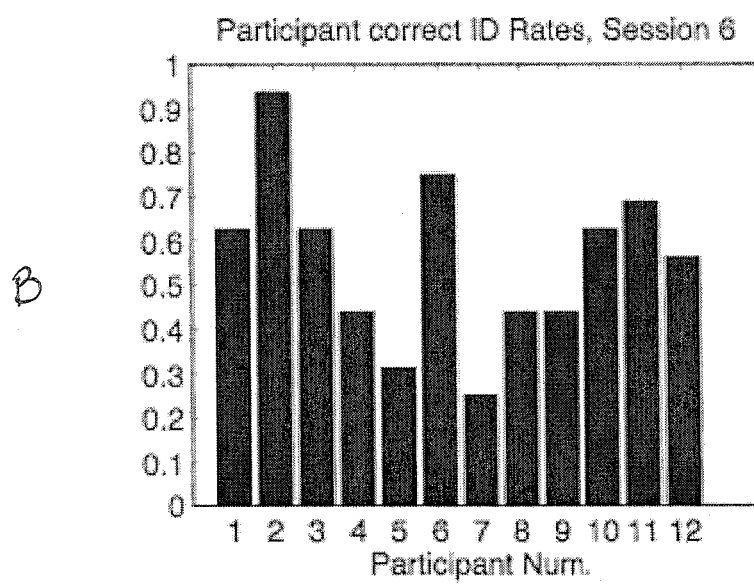

The mean rate of correct identification after six sessions of enforced learning, averaged between all participants (including both stimulus sets) was 61%, with a standard deviation of 21%. Chance performance would correspond to 12.5%. Post learning identification rates for participants in the impact transient (IT) group and for those in the wave shaping synthesis (WS) group are shown in FIG. 8. Four of the twelve participants in the IT group were able to achieve 80% or better correct identification after less than 20 minutes of enforced learning. One of the twelve participants in the WS group was able to reach this level of performance.

Figure 9A:
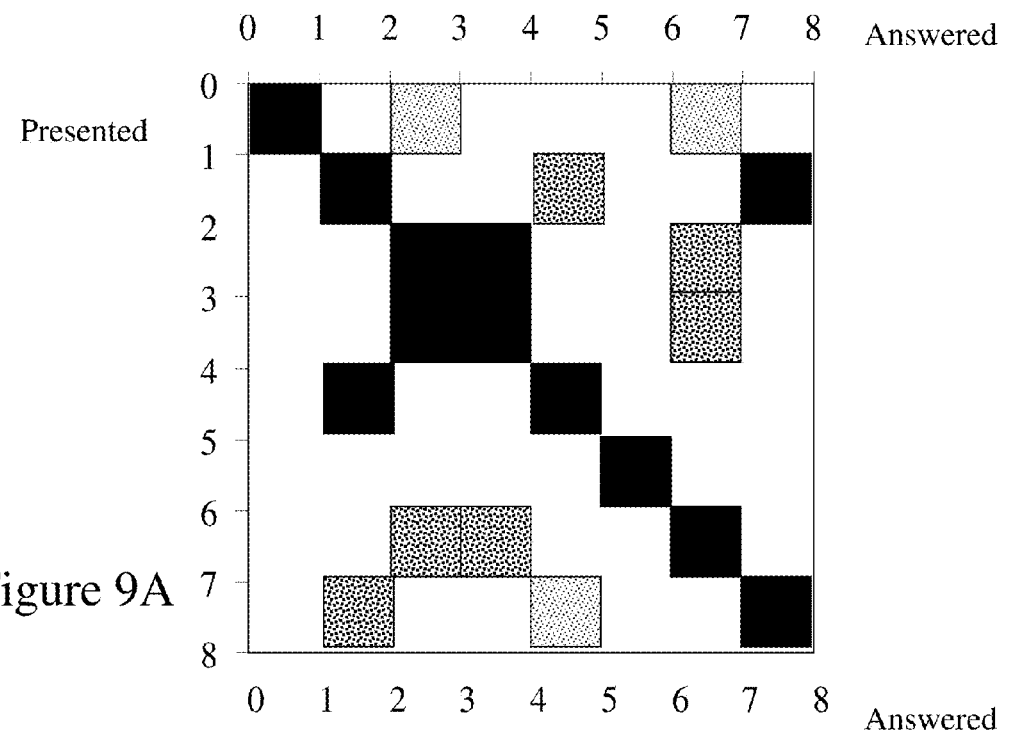
FIG. 9A graphically represents a confusion pattern within the set of eight WS stimuli in session 6, averaged between participants.
Figure 9B:
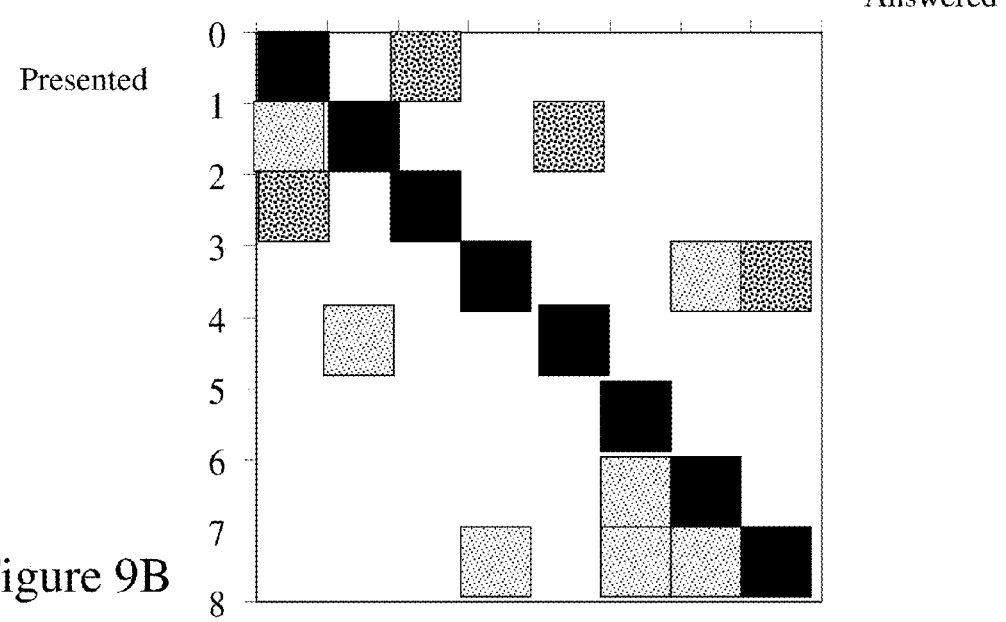
FIG. 9B graphically represents a confusion pattern within the set of eight IT stimuli in session.

The results obtained appear to be comparable to published results on absolute identification of vibrotactile stimuli via manual interfaces after short periods of learning. Enriquez et al. reported average identification performance of 73% (vs. the expected chance performance rate of 33%) after an average of 20 minutes of learning (M. Enriquez, K. E. MacLean, and C. Chita. Haptic phonemes: Basic building blocks of haptic communication. In Proceedings of the 8th International Conference on Multimodal Interfaces, 2006). The confusion patterns for the stimuli in each group of the experiment are shown in FIG. 9, averaged between all sessions and participants. The least confused stimulus was identified at an average rate of 80%, while the most confused stimulus was identified at an average rate of only 25%. A close comparison of the confusions within each stimulus set with the stimulus properties themselves did not reveal any easily discernible feature of the rhythms or the short-time waveforms that caused them to be confused. Nonetheless, the confusion patterns for the two sets appear to be relatively distinguished from one another, which suggests that the short time features were perceived differently.

Figure 10:
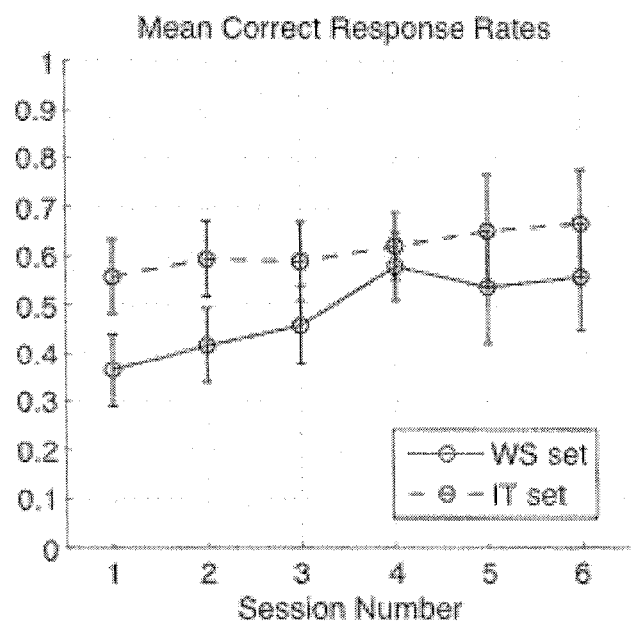
FIG. 10 presents a mean correct identification rates in each session.
Figure 11:
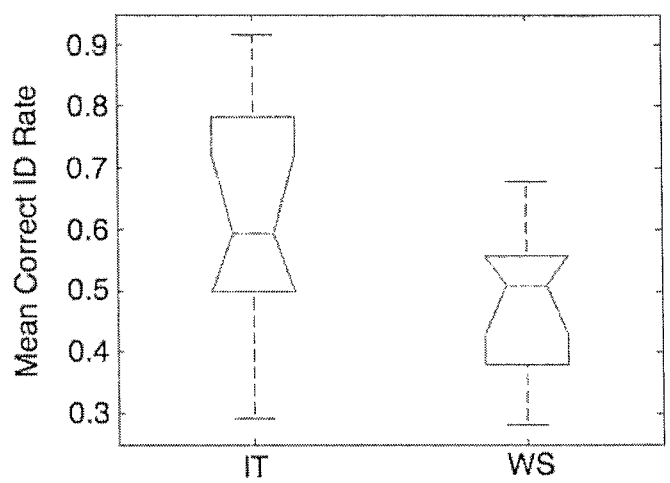
FIG. 11 is a box plot summary of a mean correct identification rate for the IT (left side) and WS (right side) stimulus sets.
Figure 12:
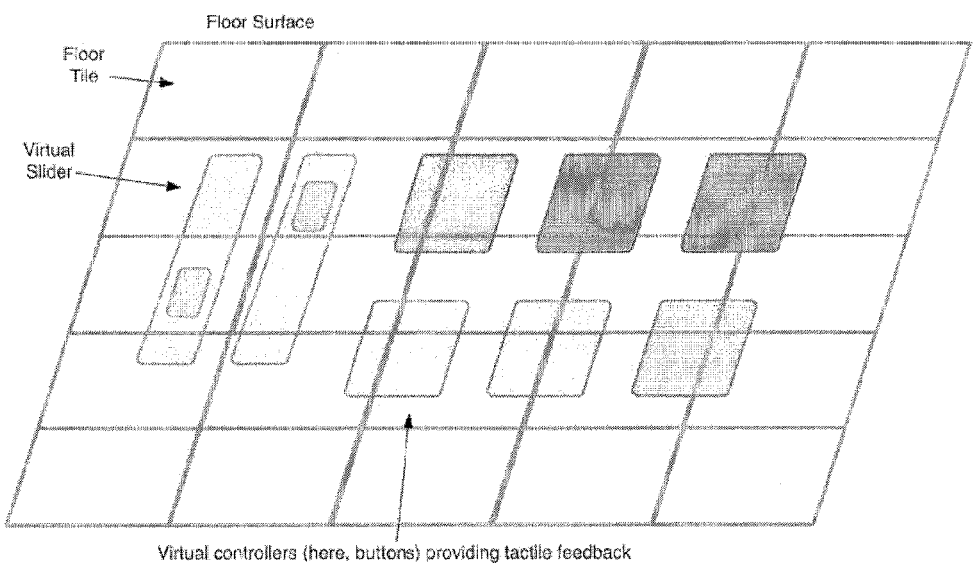
FIG. 12 schematically represents a floor surface interface with virtual sliders and controllers providing tactile feedback.
Figure 13:
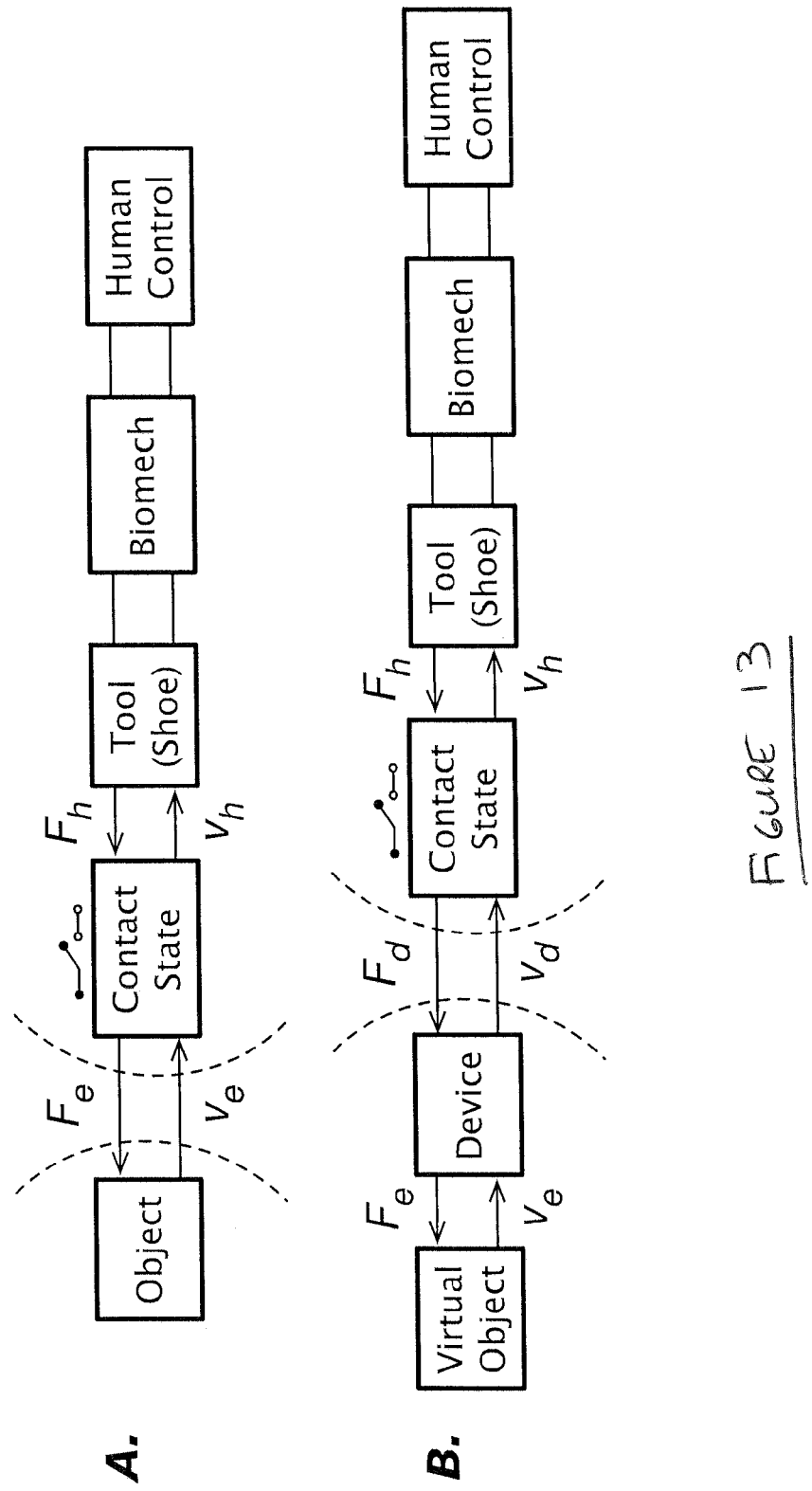
FIG. 13 schematically represents the process for generating audio and tactile feedback.

Performance varied considerably between participants as the experiment proceeded, with a few showing consistently high improvement between sessions, while others showed nearly none. A summary of the mean correct identification rate using each icon set, averaged between all sessions, is provided in FIG. 11. Mean performance on the impact transient (IT) set was higher than on the wave shaping synthesis (WS) set, but the level of significance is marginal (Anova 1-way p=0.06). Mean correct identification rates in each enforced learning session are shown in FIG. 10. The mean correct identification rate after each of the first two training sessions was significant. The IT group approached its peak performance with far fewer presentations stimuli than was the case for the WS group. Concretely, after session 1, the IT group achieved more than 80% of the performance it reached in session 6, a rate that the WS group would not achieve until session 3. This suggests that stimuli similar to the IT set might be advantageous for applications in which little training would be expected, although further investigation of this is needed. Examples of such applications could include displays in public spaces, such as crosswalk indicators.

Subjective Ratings and Comments

In descriptive comments received during pre-testing, participants described the IT stimulus set in terms of familiar impact events. As a result, these stimuli proved more recognizable, despite the smaller number of parameters that were used to distinguish them, and relative lack of note duration information in the patterns.

Participants completed questionnaires after the experiment, rating the task difficulty, subjective properties of the stimuli, providing descriptive feedback regarding the strategies they adopted. Participants were asked to rate the difficulty of the first task session and the last session on a scale from 1 (very easy) to 5 (very hard). As expected, the first task session was rated as significantly harder than the last session (mean 3.96 vs. 3.04, with p=0.04). An analysis of the rated difficulty of the first session (Anova one-way), with the stimulus set type as the independent factor, revealed the WS set was perceived as initially harder than the IT set (mean 4.4 vs. 3.5, with p=0.02). However, there were no statistically significant differences between the rated difficulties of the stimulus sets during the last session. This echoes what was seen in the performance data: the IT stimulus set was more identifiable than the WS set at the beginning of the experiment, but the difference faded before the end of the experiment. Based on participant comments, cognitive fatigue may have been a factor here.

The study also aimed to assess the level of comfort to users of a vibrotactile display employing these stimuli. Participants were asked to rate the vibrotactile stimuli on a five-point scale from 5 (comfortable) to 1 (uncomfortable). The average rating among all participants was 3.5 with a standard deviation of 1.1. No participants rated the stimuli as uncomfortable, and no significant differences in comfort ratings were found between the two groups. Some of them noted becoming uncomfortable with standing in the same place and posture during each session.

During subsequent interviews, several participants reported that the association part of the task, which required them to learn the numerical indices of the stimuli, was the hardest part of the experiment, and that they experienced cognitive fatigue as the experiment wore on. Some participants suggested the task may have been facilitated by the addition of semantic information, or a non-numerical mnemonic symbol (e.g., an animal name). This observation may hold potential for aiding the association part of the task, and, while it would certainly make sense for an application designer to consider, it does not necessarily speak to the design of the stimuli themselves.

Description of the Cause of the Stimulus

In a separate, less formal, study, ten people who did not participate in the forgoing experiment were presented with the 16 stimuli from the sets used above, in random sequential order, and were asked to provide, using their own words, a short label describing what caused the vibration. Sensory conditions were the same as in the first experiment. The most common response was "unknown" (about 18% of IT set labels, and 40% of WS set labels). 113 other responses were obtained, 72 of which were unique, if often very similar (e.g., "door knock" and "angry door knock"). Among these labels, most were related to familiar impact events, including: "door knock", "horse gallop", "hammer", "drum", "foot falls overhead", and "tapping". There appeared to be a greater tendency for IT set stimuli to be attributed to such events than was the case for WS set stimuli (mean 58% vs. 18%, with p=0.0002). Several labels were associated only to the WS set, including: "bass guitar", "cell phone", "machinery", and "car start".

Evaluation 2

Perception of Simulated Ground Material Properties

In order to ascertain the capability of the system to simulate aspects of natural ground materials, a series of experiments have been conducted on the influence of feedback supplied by the rigid surface on the perceived compliance (i.e., softness) of the ground. Although it is well established that material properties such as texture and hardness are efficiently perceptually communicated through vibrotactile sensory channels, it had not been proven that vibrations supplied via the present system (whose interface consists of a rigid plate) could be capable of simulating the degree of compliance, or softness, of the ground.

Figure 18:
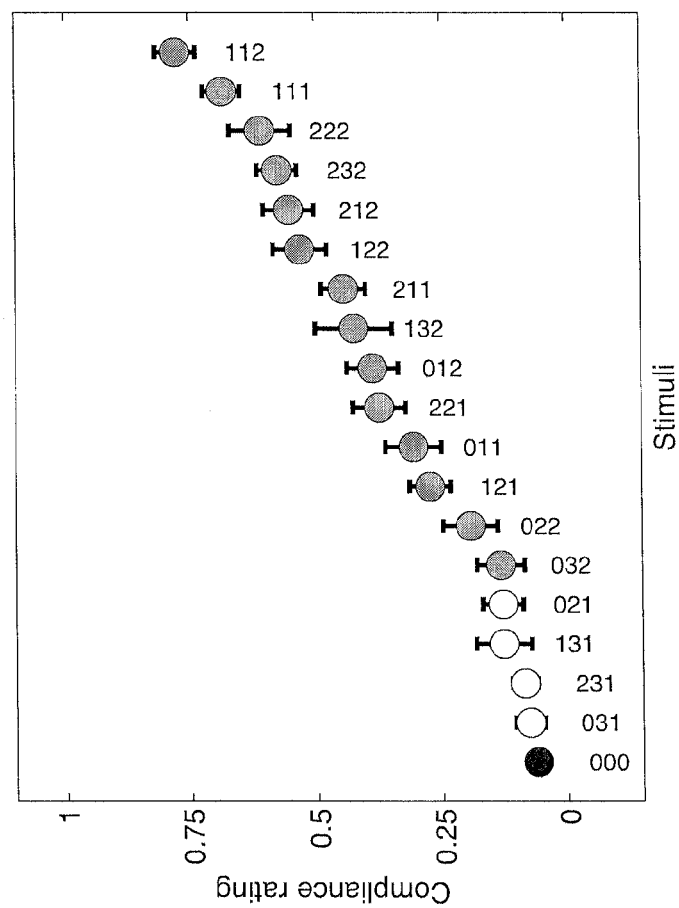
FIG. 18 is a graph depicting a subjective measurement of a level of compliance of the present system.
Figure 19:
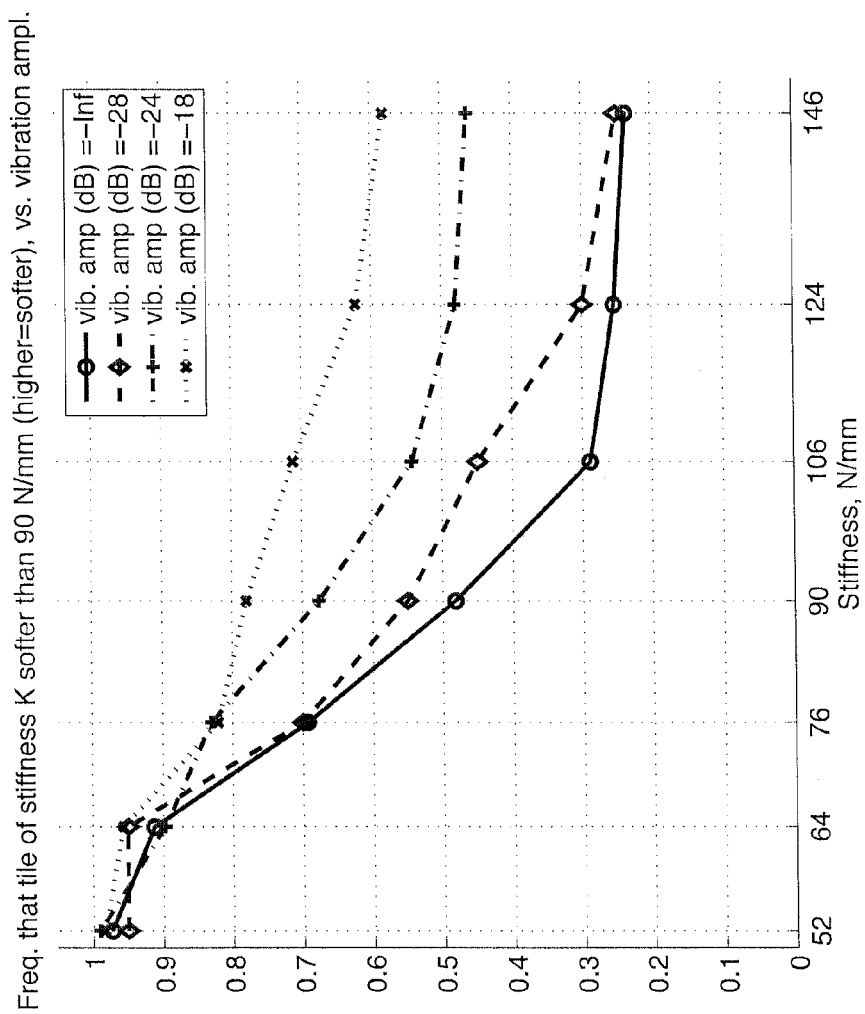
FIG. 19 is a graph depicting perceived stiffness with four different vibration amplitudes.

A series of four experiments involving more than 40 human subjects was conducted. In these experiments, subjects walked on an embodiment of the present system, which provided vibration feedback only, via the methods described herein. In one pair of experiments, it was established that a range of different types of vibration stimuli, including different vibration waveforms (textural, noise-like, and sinusoidal) and force-to-vibration (acceleration) controller configurations were capable of increasing the perceived compliance (softness) of the floor. The experiments were based on the psychophysical method of subjective magnitude estimation of the compliance of the rigid surface of the present system. Subjects walked on the latter and rated subjective compliance via a computer interface. The results are summarized in FIG. 18 The dots represent the level of perceived compliance for one configuration of the present system. The lowest rated compliance (black dot) was that corresponding to the condition in which no vibration feedback was supplied. In all cases in which vibration feedback was present, the perceived compliance of the floor tile was higher. A second experiment was conducted to ascertain the extent to which the invention is capable of modifying perceived ground surface compliance when the floor interface was, in absolute terms, more or less compliant (that is, more or less stiff). A prototype was constructed incorporating an electromechanical stage capable of modifying the true compliance of the floor tile. Participants walked on pairs of configurations of the floor tile that differed in true compliance, one of which sometimes incorporated vibration, and responded as to which felt more compliant. The experiment was based on the psychophysical method of constant stimuli. The results are summarized in FIG. 19. It shows the perceived stiffness (stiffness is the inverse of compliance) for tile configurations of 7 different stiffness values, and with four different vibration amplitudes. The results show that as the amount of vibration feedback supplied by the present system is increased, perceived compliance increases monotonically.

Together, these results demonstrate that the present system is capable of simulating properties of natural ground surfaces, and in particular, of simulating properties such as compliance that, based on prior art, it is not known how to simulate via a device that can supply vibrotactile feedback without supplying low frequency force feedback via a haptic force feedback device (which is a far more costly and challenging alternative to that described in the present system).

Furthermore, these results demonstrate that the system is capable of simulating properties of natural ground surfaces, as compliance is one important property thereof, unlike material properties such as texture, which have a fundamentally vibrational character).

Scope

Although the present system has been described in various aspects, the present system is not limited to such aspect. Many modifications and changes can be made to the present system, without departing from the scope of the present system. The scope of protection of the present system is thus provided in the appended claims.

What is claimed is:

1. A device comprising:
   a surface to form part of a flooring structure for use by a user formed from a first material having a first stiffness;
   a sensor coupled to the surface and a controller, the sensor providing a sensor output signal in dependence upon pressure being applied to the surface by the user by moving at least one of onto, across, and off the surface;
   at least one vibrotactile actuator coupled to the surface, the at least one vibrotactile actuator for receiving a control signal from the controller and generating a vibratory motion of the surface during the user's movement; and
   the controller for generating the control signal to the at least one vibrotactile actuator, the control signal controlling the vibratory motion of the surface generated by the at least vibrotactile actuator and established in dependence upon at least the sensor output signal and a second material; wherein
   the vibratory motion applied to the surface by the at least one vibrotactile actuator in combination with the user's pressure upon the surface modify a first compliance the user associates with the surface as being lower than a second compliance the user associates with the surface when no vibratory motion is applied.

2. The device according to claim 1, wherein
   the reduction in compliance that the user associates is linear with increasing amplitude of the vibratory motion.

3. The device according to claim 1, wherein
   the surface, at least one vibrotactile actuator, and controller operate in conjunction with one another to present the user associated reduction in compliance of the surface without a haptic force feedback device being coupled to the surface.

4. The device according to claim 1, wherein
   the surface is one of a plurality of surfaces, each having an initial defined stiffness of at least 70N/mm;
   each surface of the plurality of surfaces comprises a sensor coupled to the surface providing a sensor output signal in dependence upon pressure being applied to that surface of the plurality of surfaces to the controller; and
   as the user applies pressure to a subset of the plurality of surfaces the controller applies to each vibrotactile actuator coupled to a surface of the subset of the plurality of surfaces the control signals required to generate the vibratory motion commensurate with the user's motion that generates the pressure applied to the subset of the plurality of surfaces such that the user associates the surfaces as having a compliance lower than the second compliance.

5. The device according to claim 1, further comprising the surface is one of a plurality of surfaces, each having a defined relationship to the remainder of the plurality of surfaces;
   each surface of the plurality of surfaces comprises a sensor coupled to the surface providing a sensor output signal in dependence upon pressure being applied to that surface of the plurality of surfaces to the controller; and
   as the user applies pressure to a subset of the plurality of surfaces the controller applies to each vibrotactile actuator coupled to a surface of the subset of the plurality of surfaces the control signals required to generate with that surface of the subset of the plurality of surfaces the vibratory motion that is both commensurate with the user's motion that generates the pressure applied to the subset of the plurality of surfaces such that the user associates the surfaces as having a compliance lower than the second compliance and the location of the surface within the subset of the plurality of surfaces.

6. The device according to claim 1, wherein the surface forms part of a pedestrian area and provides the user with information communicated to them via their foot or feet, the information relating to at least one of navigation within the pedestrian area, a warning relating to an event within the immediate vicinity of the pedestrian area, and location within the pedestrian area.

7. The device according to claim 1, wherein the control signal comprises a first signal relating to an adjustment in the user associated compliance established in dependence upon the controller receiving an indication relating to the selection of a ground material and a second signal relating to at least one of auditory feedback and visual feedback, wherein when the second signal relates to auditory feedback it is provided via at least one of the vibrotactile actuator and a loudspeaker and when the second signal relates to visual feedback it is provided by at least one of a display and a projector.

8. The device according to claim 1, wherein the control signal comprises a first signal relating to an adjustment in the user associated compliance established in dependence upon the controller receiving an indication relating to the selection of a ground material and a second signal relating to at least one of an auditory signal and a visual signal, wherein
   the second signal is established in dependence upon the indication relating to the selection of the ground material; and
   when the second signal relates to an auditory signal it is provided via at least one of the vibrotactile actuator and a loudspeaker and when the second signal relates to a visual signal it is provided by at least one of a display and a projector.

9. The method according to claim 1, wherein the vibratory motion generated by the at least one vibrotactile actuator coupled to the surface is only generated in response to a variation in the pressure applied to the surface.

10. The method according to claim 9, wherein the device further comprises a suspension mechanism for supporting and isolating the surface from an area upon which the device is mounted.

11. A device comprising:
    a surface to form part of a flooring structure for use by a user formed from a first material having a first stiffness;
    a sensor coupled to the surface and a controller, the sensor providing a sensor output signal in dependence upon pressure being applied to the surface by the user by moving at least one of onto, across, and off the surface;
    at least one vibrotactile actuator coupled to the surface, the
       at least one vibrotactile actuator for receiving a control signal from the controller and generating vibratory motion of the surface during the user's movement; and
    the controller for generating the control signal to the at least one vibrotactile actuator, the control signal controlling the vibratory motion of the surface generated by the at least vibrotactile actuator and established in dependence upon at least the sensor output signal, a second material, and a virtual impact transient model relating to human locomotion on the second material.

12. The device according to claim 11, wherein
    the virtual impact transient model relating to human locomotion on the second material is derived from physical measurements of individuals walking upon the surface and the second material.

13. The device according to claim 12, wherein the plurality of second materials include at least one second material that is particulate in nature.

14. The device according to claim 11, further comprising
    the virtual impact transient model relating to human locomotion on the second material is a model relating to human locomotion on a plurality of materials of which the second material is one, wherein the model is derived from physical measurements of individuals walking upon the surface and the plurality of second materials.

15. The device according to claim 11, wherein the control signal comprises a first signal relating to the vibratory motion of the surface established in dependence upon the controller receiving an indication relating to the selection of a second material and a second signal relating to at least one of auditory feedback and visual feedback, wherein the second signal is established in dependence upon the second material.

16. The device according to claim 11, wherein
    the surface is one of a plurality of surfaces, each having a defined relationship to the remainder of the plurality of surfaces;
    each surface of the plurality of surfaces comprises a sensor coupled to the surface providing a sensor output signal in dependence upon pressure being applied to that surface of the plurality of surfaces to the controller; and
    the controller as the user applies pressure to a subset of the plurality of surfaces applies to each vibrotactile actuator coupled to a surface of the subset of the plurality of surfaces the control signals required to generate with that surface of the subset of the plurality of surfaces the vibratory motion that is both commensurate with the user's motion that generates the pressure applied to the subset of the plurality of surfaces such that the user associates the surfaces as having a compliance lower than the second compliance and the location of the surface within the subset of the plurality of surfaces.

17. A method comprising:
    storing first data relating to a virtual impact transient model within a memory of a controller, the virtual impact transient model defining frequency and amplitude data relating to the vibratory motion of a surface formed from a first material, the virtual impact transient model generated based upon surveying a plurality of individuals for their views of the compliance of the surface under a range of vibratory excitations and the compliance of other floor surfaces comprised of other materials;
    receiving at the controller second data relating to a material;
    receiving at the controller third data relating to pressure being applied to a tile that forms part of a flooring structure being used by a user in moving at least one of onto, across, and off the surface;
    generating with the controller a control signal for controlling a mechanical actuator coupled to the tile, the control signal generated in dependence upon at least first data, the second data and the third data.

18. The method according to claim 16, wherein
    the virtual impact transient model relates to a plurality of natural ground surfaces.

19. The method according to claim 16, wherein
    the tile is one of a plurality of tiles, each having an initial defined stiffness of at least 70N/mm;
    each tile of the plurality of tile comprises a sensor coupled to the surface providing a sensor output signal in dependence upon pressure being applied to that tile of the plurality of tile to the controller; and
    as the user applies pressure to a subset of the plurality of tile the controller applies to each vibrotactile actuator coupled to a tile of the subset of the plurality of tile the control signals required to generate the vibratory motion commensurate with the user's motion that generates the pressure applied to the subset of the plurality of tile such that the user associates the surfaces as having a compliance associated with the material to which the second data relates.

20. The method according to claim 16 wherein,
the controller generates both the control signal and a second signal, the second signal generated in dependence upon at least the second data and relating to providing at least one of auditory feedback and visual feedback to increase the user's perception that they are moving upon a region comprising the second material.

\* \* \* \* \*